(12) United States Patent
Rasmussen et al.

(10) Patent No.: US 12,345,313 B2
(45) Date of Patent: Jul. 1, 2025

(54) LOCKING AGAINST ROTATION OF ELECTRIC MOTOR OF A LINEAR ACTUATOR

(71) Applicant: LINAK A/S, Nordborg (DK)

(72) Inventors: Ulrik Nytoft Rasmussen, Nordborg (DK); Frederik Hedevang Lyngdorf, Aarhus V (DK); Michael Randløv, Vojens (DK); Jesper Madsen Wolf, Broager (DK)

(73) Assignee: Linak A/S, Nordborg (DK)

( * ) Notice: Subject to any disclaimer, the term of this patent is extended or adjusted under 35 U.S.C. 154(b) by 109 days.

(21) Appl. No.: 18/000,511

(22) PCT Filed: Jun. 2, 2021

(86) PCT No.: PCT/DK2021/000177
§ 371 (c)(1),
(2) Date: Dec. 1, 2022

(87) PCT Pub. No.: WO2021/244715
PCT Pub. Date: Dec. 9, 2021

(65) Prior Publication Data
US 2023/0272845 A1    Aug. 31, 2023

(30) Foreign Application Priority Data

Jun. 2, 2020  (DK) .......................... PA 2020 00649
Feb. 26, 2021 (DK) .......................... PA 2021 00216

(51) Int. Cl.
*F16H 25/24*    (2006.01)
*F16H 25/20*    (2006.01)
(Continued)

(52) U.S. Cl.
CPC ..... *F16H 25/2454* (2013.01); *F16H 25/2021* (2013.01); *H02K 7/06* (2013.01);
(Continued)

(58) Field of Classification Search
CPC ............. F16H 25/2454; F16H 25/2021; F16H 2025/2071; H02K 11/215
See application file for complete search history.

(56) References Cited

U.S. PATENT DOCUMENTS 4,697,672 A * 10/1987 Linton .................... F16D 67/00
                                                          188/134
5,131,510 A *  7/1992 Jamrus .................... G21C 7/12
                                                          376/242
(Continued)

FOREIGN PATENT DOCUMENTS

EP      1985883 A2   10/2008
EP      1320176 B1    5/2010
(Continued)

*Primary Examiner* — Gregory Robert Weber
(74) *Attorney, Agent, or Firm* — Dykema Gossett PLLC

(57) ABSTRACT

The present invention relates to a linear actuator with an improved electric motor. In particular, the invention focuses on improved technical solutions for braking or locking of a rotating electric motor by using an electro-mechanical locking mechanism. The mechanism uses a solenoid having a nonrotating locking element, which is displaceable by solenoid action and arranged to engage with a rotating locking element. In particular, solutions have been found in which a surprisingly small solenoid with a much-reduced requirement on stroke length may be deployed to effectively unidirectionally or bidirectionally lock against rotation of the motor.

18 Claims, 26 Drawing Sheets

Figure 1A:
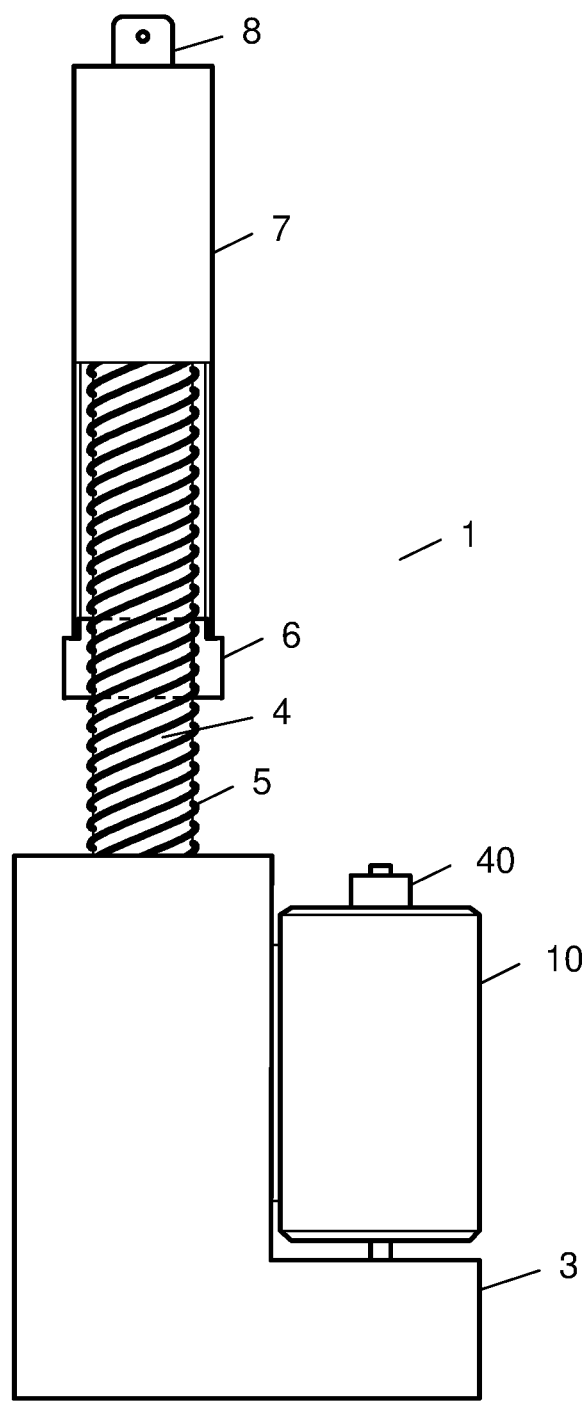

(51) Int. Cl.
  *H02K 7/06*   (2006.01)
  *H02K 7/116*  (2006.01)
  *H02K 7/12*   (2006.01)
  *H02K 11/215* (2016.01)
  *H02K 11/33*  (2016.01)
  *A47B 9/04*   (2006.01)

(52) U.S. Cl.
  CPC ........... *H02K 7/1166* (2013.01); *H02K 7/125* (2013.01); *H02K 11/215* (2016.01); *H02K 11/33* (2016.01); *A47B 9/04* (2013.01); *A47B 2200/004* (2013.01); *A47B 2220/0002* (2013.01); *F16H 2025/2081* (2013.01); *H02K 2211/03* (2013.01)

(56) References Cited

U.S. PATENT DOCUMENTS

| | | | |
|---|---|---|---|
| 5,398,780 A * | 3/1995 | Althof | F16H 25/20 188/185 |
| 6,349,801 B1 * | 2/2002 | Koth | F16D 65/18 188/72.8 |
| 6,448,877 B1 † | 9/2002 | Harayama | |
| 8,056,683 B2 † | 11/2011 | Usui | |
| 9,369,026 B2 | 6/2016 | Wu | |
| 2003/0218392 A1 | 11/2003 | Frey et al. | |
| 2007/0169578 A1 * | 7/2007 | Christensen | F16H 25/2021 74/625 |
| 2008/0251329 A1 | 10/2008 | Rettmar et al. | |
| 2010/0319477 A1 | 12/2010 | Tateishi et al. | |
| 2012/0068635 A1 | 3/2012 | Koch et al. | |
| 2015/0228431 A1 * | 8/2015 | Suzuki | H01H 51/06 335/133 |
| 2016/0027602 A1 † | 1/2016 | Hasegawa | |
| 2017/0170708 A1 | 6/2017 | Borts et al. | |
| 2018/0135710 A1 † | 5/2018 | Sala | |
| 2018/0331638 A1 * | 11/2018 | Bastholm | H02P 6/08 |
| 2019/0360609 A1 † | 11/2019 | Roether | |

FOREIGN PATENT DOCUMENTS

JP    5321565 B2 †  10/2013
KR  101405042 B1 †   6/2014

\* cited by examiner
† cited by third party

LOCKING AGAINST ROTATION OF ELECTRIC MOTOR OF A LINEAR ACTUATOR

CROSS-REFERENCE TO RELATED APPLICATIONS

This application is a national stage filing based upon International PCT Application No. PCT/DK2021/000177, filed 2 Jun. 2021, which claims the benefit of priority to Denmark application Nos. PA 2020 00649, filed 6 Jun. 2020 and PA 2021 00216, filed 26 Feb. 2021, all of which are incorporated by reference as if fully set forth herein.

The present invention relates to a linear actuator with an improved electric motor. In particular, the invention focuses on improved technical solutions to braking or locking of an electric motor. Throughout this description the term "motor" shall refer to an electric motor.

Linear actuators and electric motors are useful for delivering mechanical power to machines for lifting or otherwise moving a load. Locking or braking is desirable in order to make the movement of such lifting machines irreversible, in particular to ensure that when the electrical power to the motor is switched off, external forces on the machine cannot cause the motor to rotate. In a lifting machine, such locking or braking enables the machine to retain the load in position after the motor is electrically switched off.

BACKGROUND OF THE INVENTION

In some applications, it has become common practice to depend on frictional restraints in a lifting machine and/or a motor to achieve a sufficient degree of braking or locking. The rotational mechanical power of the motor is often transformed and transmitted through gearing arrangements whereby friction is inevitably introduced, thereby assisting in load holding behavior. Certain gearings e.g. worm gears may be specifically designed to achieve high friction. A motor equipped with such gearing is sometimes referred to as "self-locking". Another means to achieve braking is by introducing a wrap spring clutch on a rotating shaft of a machine. An example hereof is disclosed in U.S. Pat. No. 9,369,026. When properly installed, a wrap spring clutch may exert a higher frictional force when the shaft rotates in one direction than in the other direction.

A braking effect may further be enabled by deploying a motor designed specifically to exhibit a so-called detent torque or cogging torque stemming from magnetic interactions between a stator and a rotor of the motor even when the motor is switched off.

The above solutions carry the disadvantage of not providing a sufficiently secure and reliable locking. An additional drawback is that energy is wasted on overcoming friction and/or cogging torque as the braking effects remains during operation of the machine and motor. Relying on friction is not always satisfactory due to the braking effect being dependent on e.g. lubrication, manufacturing tolerances, and wear. A further disadvantage of relying on friction is, for example in the event of a fault situation, when an exceedingly large torque is exerted on the rotating shaft of the machine and motor. In such a situation the rotating shaft and motor will unintentionally rotate further, causing unreliable locking.

Locking against rotation of an electric motor may also be implemented (as a supplement or substitution for any of the above solutions) by using ring shaped discs for locking. Examples hereof are disclosed in e.g. US 2008/0251329 and EP 1320176. A ring-shaped disc attached to a shaft or other rotating element may be selectively moved from a position, in which it is out of engagement with an opposing fixedly arranged ring-shaped disc, to a locked or braked position in which it engages and frictionally interferes with the fixed ring-shaped disc. One or the other disc may be moved in an axial direction by an external force. The external force may be of any known kind. In some applications, an electromagnetic force is preferred to activate such a motor lock, e.g. by using a solenoid mechanism. The mechanism is arranged with a spring return. The solenoid enables the movement of a locking part in a direction parallel to the motor shaft axis. The solenoid is shaped as a ring through which the motor shaft passes. The solenoid of known designs is centrally placed on the motor axis. This requires the coil winding to be large and heavy.

These solutions further carry the disadvantage of being unnecessarily bulky. It is also a drawback to rely on the frictional forces between the surfaces of two ring-shaped discs, since frictional characteristics are known to depend on external factors, which cannot be appropriately controlled during the lifetime of a motor. As mentioned above, a further disadvantage of relying on friction is when an exceedingly large torque is exerted on the shaft of the motor. In such a situation the frictional forces between the surfaces of the two ring-shaped discs will be overcome, causing unreliable locking. An unacceptable noise is associated with the snapping back and forth of the comparatively large rings when starting and stopping the motor. For the motor lock to be reliable, costs are incurred due to the fact that strict manufacturing tolerances must be adhered to. In particular for a motor in which it is necessary to lock rotation in one direction only, these motor lock designs appear to be more robust and have more features than often necessary for their intended use. Also, for a motor lock which locks in both directions, it would be advantageous to propose a less bulky design.

Other known motor locking mechanisms comprise a solenoid actuated pin, where the pin is arranged to selectively engage or disengage a gear wheel. An example hereof is disclosed in US 2010/0319477. The gear wheel further serves as an operational part of a mechanism to gear down the rotational speed of the motor output shaft. The gear wheel forms part of a gearing mechanism and is arranged in close proximity to the motor. This arrangement carries the disadvantage of an unreliable engagement with the lock. It also requires a large solenoid mechanism with a long stroke resulting in a bulky and costly design. Another disadvantage is that in the event the motor shaft is exerted to an exceedingly large torque, the solenoid mechanism may be damaged causing malfunction of the mechanism.

Yet another solenoid actuatable motor lock design is known in which locking occurs when a pin is driven into a longitudinal groove of a shaft in a direction radial to the motor shaft. An example hereof is disclosed in US 2017/0170708. An additional drawback of such a design is that it weakens the motor shaft. This carries a further disadvantage as the weaker motor shaft could be broken, if motor shaft should be exerted to an exceedingly large torque.

For the above pin in gear wheel lock as well as for the solution using rotating and fixed rings to lock, the electromagnetically actuated lock is necessarily equally effective against rotation in both directions. This may be seen as a disadvantage in the case of malfunctioning of the lock. If the lock cannot be released, motor rotation is not possible in any direction, making a recovery from the fault situation more difficult.

One important field of application of a motor brake or motor lock is in a linear actuator, in particular in spindle and nut driving linear actuators. These linear actuators comprise a driving motor, often with additional gearing arrangements beyond the spindle and nut itself. Such devices are increasingly used in e.g. furniture where they are used for adjusting a piece of furniture to a user selectable setting and to keep that setting while the electric motor is switched off.

SUMMARY OF THE INVENTION

The abovementioned problems, drawbacks, and disadvantages with known electromagnetically actuated motor locks have been solved at least in part by a motor locking mechanism comprising an electromechanical transducer as presented below. In particular, solutions have been found in which a surprisingly small electromechanical solenoid with a much-reduced requirement on stroke length may be deployed to effectively unidirectionally lock against rotation. Embodiments will be shown with electromechanical solenoids moving a nonrotating locking part in a direction parallel to the motor shaft axis, whereas other embodiments have electromechanical solenoids moving a nonrotating locking part in a direction orthogonal to the motor shaft axis. Meanwhile, arranging two small electromechanical solenoids with the same reduced stroke length, a bidirectional lock will also be shown.

The motor comprising the lock mechanism according to the invention may act on a rotating locking element e.g. a dedicated locking disc or a dedicated locking sleeve. Cam elements are constructed on the locking disc or on the locking sleeve. Each cam has a non-engageable side located opposite an engageable side. In some embodiments, the non-engageable side is a sloping side and the engageable side is a steep side. The steep side is typically approximately orthogonal to the surface of the locking disc or the locking sleeve. Such cam designs ensure high strength of the cams against shear. The cams are durable and allows for the rotating locking element to be designed lighter and smaller than would be feasible with conventional cams.

The motor lock mechanism according to the invention focuses among other things on locking against rotation in one direction only, thus creating freedom of design and reducing costs. This creates a lightweight yet reliable unidirectional motor lock, which will keep a motor operable in one direction, even in fault situations where the motor shaft gets stuck and the lock keeping the motor from rotating in the other direction may not readily be released, thereby allowing to back out of a fault situation by reversing the direction of rotation. Even if a bidirectional embodiment is applied, if a fault situation locks one solenoid mechanism, it will be possible to release the lock by reversing as long as the other solenoid mechanism is either not locked or unaffected by the fault and thereby able to be operated.

The rotating locking element may be attached to the shaft of the motor, e.g. at an output end or a back end thereof. In the present document, output end and front end are used as interchangeable terms. The same applies for back end and rear end.

The mass of the elements moved during locking and unlocking are significantly smaller than in other known designs, thus resulting in any disturbing noise becoming negligible. In the motor lock according to the invention, a small stroke of a diminutive solenoid may be amplified by a pivot arm biased by a leaf spring, where the pivot arm is carrying a nonrotating locking element at a distal end.

The electromechanical solenoid comprises a coil. One end of the coil presents itself as a base of the solenoid to be suitably used for fixing the solenoid directly or indirectly to a motor housing. At the opposite top side of the coil, a nonrotating locking element is displaceable by solenoid action and arranged to engage with a rotating locking element. When locking occurs under a load, the two locking elements are in contact, and a transverse force acts on the pivot arm and thereby on the solenoid. Said force attacks the pivot arm, which is supported only by a bend or a hinge of the leaf spring as it must be able to pivot back and forth between a projected position and a retracted position. In some embodiments, it is preferable to support the solenoid at a point near its top opposite to the nonrotating locking element, thereby stabilizing the solenoid against a tilting force. In preferred embodiments, the support at the top of the solenoid shall support a part of the pivot arm where the leaf spring is bent or hinged. The support shall be directly or indirectly fixed to the motor housing.

In an embodiment the motor locking mechanism comprises a torque limiting clutch arranged between the motor shaft and the rotating locking element. The toque limiting clutch essentially anticipates and avoids damaging the locking mechanism, i.e. the rotating locking element, in the event that an excessive torque shall on the motor shaft.

In its basic form, it is not intended that any overload in terms of excessive torque shall occur on the rotating locking element. However, in certain situations, such as a fault situation, it might nevertheless be found that such a torque overload case will happen. One such fault situation would occur, should the locking mechanism be activated while the electric motor is running. Another overload fault may be where an excessive torque is applied to the motor shaft in a situation where the electric motor has already been stopped and locked via the locking mechanisms. Most critically, an overload situation may be characterized as a sudden impact acting on the rotating locking element.

Due to its features of small and lightweight components, the motor lock may be damaged. In particular, there may be a risk of damaging a cam of the rotating locking element itself or damaging the total structure of the rotating locking element or of damaging the non-rotating locking element.

This problem has been solved by the motor locking mechanism of the present invention by arranging a torque limiting clutch between the motor shaft and the rotating locking element, thereby essentially anticipating and avoiding said damage.

The torque limiting clutch may be introduced in several different positions in relation to the two elements of a motor shaft and a rotating locking element:

Between an inner surface of a cup-shaped or hollow end of a rotating locking element and an outer side of the motor shaft—thereby establishing the clutch integrated with the rotating locking element.

Between the inside of a cup-shaped or hollow distal end of the motor shaft and the outside of the rotating locking element Between a proximal and a distal part of a motor shaft, thereby establishing the clutch at a distance from the rotating locking element.

It is further noted that the rotating locking element on which the torque limiting clutch is acting may be either of disc type or sleeve type as introduced above.

Several clutching principles may be applied:
Piezo crystal electromechanical clutch
Dog clutch
Torque limiter
Centrifugal clutch
Circlip-Locking ring principle
Coil spring with single turn winding
Coil spring with multiple turn winding It is noted that when considering a coil spring principle clutch, typically comprising a helically would wire several materials and dimensions of wire are possible. In addition, the wire may have a cross section of any suitable form such as circular, rectangular, trapezoidal, elliptical etc.

A coil spring torque limiting clutch may comprise that a first end of the coil wire is fixed to either the motor shaft or to the rotating locking element, the second end of the coil wire remaining a free end. Alternatively, the second end of the coil wire may be fixed to the same element that the first end is fixed to.

In the present disclosure the term torque limiting clutch is defined as any active or passive mechanism which serves to limit the torque acting on a rotating locking element to a certain maximal predetermined value. Embodiments of a torque limiting clutch comprise but are not limited to any of the above features and in any combination.

The presence of these and other features distinguishes the present motor locking mechanism from other known electromagnetically actuated motor locks.

The invention may be further summarized by observing the below embodiments:

A linear actuator comprises an electric motor, a spindle driven by said reversible motor, and a spindle nut mounted on the spindle and secured against rotation, said spindle nut being arranged to be moved between two end positions. The electric motor comprises a stator attached to a motor housing and a rotor comprising a motor shaft, where the motor is adapted to be electrically controlled to selectively rotate the rotor in one of two opposite angular directions. The electric motor further comprises an electromechanical locking mechanism, said electromechanical locking mechanism comprising an electromechanical transducer, which is attached immovably in relation to the motor housing and comprises a nonrotating locking element, the electromechanical transducer being adapted to be electrically controlled to selectively shift the non-rotating locking element between a projected and a retracted position, and a rotating locking element attached to the motor shaft and comprising at least one cam projecting in a direction towards the transducer, wherein the at least one cam comprises a non-engageable side opposite to an engageable side. The non-rotating locking element is arranged to project in a direction towards the rotating locking element and to interferingly lock with the at least one cam by selectively engaging the engageable side of the at least one cam. The electromechanical transducer is configured to control the engagement by keeping the nonrotating locking element in a position not engaging the engageable side of the at least one cam, when the electromechanical transducer is energized, and the electromechanical transducer further comprises a spring element arranged to keep the nonrotating locking element in a position engaging the engageable side of the at least one cam, when the electromechanical transducer is not energized. Thereby, the electromechanical locking mechanism is configured to lock the motor shaft against rotation in one rotational direction, thereby locking the motor unidirectionally.

In an embodiment of the linear actuator, the electromechanical transducer is an electromechanical solenoid comprising a coil and the nonrotating locking element. However, other types of electromechanical transducers can be used as well. As examples, piezoelectric actuators or micro actuators can be mentioned.

When the motor is locked and under load, a compressive load-holding force is transferred from the rotating locking element to the nonrotating locking element. The pivot arm may form an angle with the surface of the rotating locking element on the side where it carries an engageable cam side. This angle may be less than 30 degrees, or less than 15 degrees, or less than 12 degrees, or less than 9 degrees, and for instance larger than 3 degrees or larger than 6 degrees.

In an embodiment of the linear actuator, the electromechanical solenoid comprises a pivot arm, where a distal end of said pivot arm constitutes the nonrotating locking element and the pivot arm further comprises an armature configured to be activated by a current in said coil, and that said spring element comprises a leaf spring configured to bias the pivot arm in a direction towards said rotating element. It is noted that due to the gear ratio of a linear actuator, i.e. caused by the spindle as well as the transmission or reduction gear, a strong force applied to the linear actuator in e.g. a height adjustable table will be reduced to a considerably lower force at the motor shaft of the actuator. Thus even with a heavy load on the actuator it can be locked with the use of a locking mechanism with a small electromechanical solenoid using a leaf spring as the spring element.

In an embodiment of the linear actuator, the electromechanical solenoid is implemented by a subminiature signal relay. In that case, the contact set of the relay may either be omitted, left unused or used for providing a feedback signal indicating whether or not the locking mechanism is locked.

In an embodiment of the linear actuator, the electromechanical transducer further comprises a support member immovably attached to the housing and configured to support the electromechanical solenoid against tilting and shearing forces. This support member further helps to ensure that a small electromechanical solenoid using a leaf spring as the spring element is sufficient to lock even with a heavy load on the actuator.

In an embodiment of the linear actuator, a longitudinal axis of the motor shaft is offset from a longitudinal axis of the solenoid coil.

In an embodiment of the linear actuator, a longitudinal axis of the motor shaft and a longitudinal axis of the solenoid coil are parallel but not coincident.

In an embodiment of the linear actuator, the rotating locking element is shaped as a locking disc, where the at least one cam is positioned on an otherwise essentially planar side of the disc pointing towards the solenoid, where said disc is arranged in proximity of the solenoid to allow the nonrotating locking member to engage with the engageable side of the at least one cam.

In an embodiment of the linear actuator, a longitudinal axis of the motor shaft and a longitudinal axis of the solenoid coil are orthogonal.

In an embodiment of the linear actuator, the rotating locking element is constructed as a locking sleeve, with the at least one cam positioned on an otherwise essentially circularly curved surface of the sleeve pointing towards the solenoid, where the sleeve is arranged in proximity of the solenoid to allow the nonrotating locking member to interact with the engageable side of the at least one cam.

In an embodiment of the linear actuator, the locking mechanism is arranged at the output end of the motor shaft.

In an embodiment of the linear actuator, the locking mechanism is arranged at the back end of the motor shaft of the motor.

In an embodiment of the linear actuator, the motor comprises a torque limiting clutch arranged between the rotating locking element and the motor shaft. The torque limiting clutch may be a coil spring with a multiple turns winding, wherein the winding is connected to the motor shaft with a tight grip, and a free end of the coil spring is attached in a slot in the rotating locking element.

In an embodiment, the motor comprises a rotating member facilitating detection of rotation such as a ring magnet for a hall sensor or an optical disc for an optical sensor. The rotating member is fixedly arranged on the motor shaft and at least one rotation sensor, i.e. the hall sensor or the optical sensor, is directly or indirectly fixed to the housing.

In an embodiment of the linear actuator, the at least one rotation sensor is mechanically and electrically connected to a printed circuit board, the printed circuit board being immovably attached in relation to the motor housing.

In an embodiment of the linear actuator, said printed circuit board is also holding the electromechanical transducer and providing electrical connections thereto.

In an embodiment, the motor comprises a controller adapted for receiving a signal from the at least one rotation sensor, where the controller comprises a processor, and where the controller is configured to exert position, speed and direction controls for the motor. Further, the controller is capable of switching the nonrotating locking element between its projected and its retracted position by switching the electrical current to the coil of the solenoid on or off.

In an embodiment, the electromechanical locking mechanism comprises a rotating locking element comprising two sets of cams arranged in opposite directions, and two electromechanical transducers, each one being arranged to have its nonrotating locking element selectively engage the engageable side of a respective one of the two oppositely arranged sets of cams.

In another embodiment, the exterior of the motor housing displays a flattened geometry and is shaped with two parallel planar surfaces, preferably at each side, said planar surfaces being connected by arc-shaped surfaces.

The invention additionally comprises an actuator system comprising a linear actuator as mentioned above, a control box comprising at least a power supply and a driver circuit configured to drive the electric motor of the linear actuator, and a cable connecting the linear actuator to the driver circuit in the control box.

In an actuator system comprising a linear actuator mechanism having a spindle and nut, driven by an electric motor according to any of the above embodiments, the actuator mechanism is adapted for use in a loading pattern where the load is normally expected to be unidirectional, so that rotation of the motor shaft in a direction against the expected load requires significantly more power than in the opposite direction, which is rotation with the expected load. An example of this can be a height adjustable table with a heavy load placed on the top of the table, where the actuator mechanism is configured to raising and lowering the table, respectively. In this case, it requires significantly more power to raise the table, because the motor can be considered as working against the expected load, than to lower it, where the motor would be working with the expected load. In such a situation, the unidirectionality of the locking mechanism ensures that the locking mechanism is configured to lock the motor shaft against rotation in the direction (the locking direction), where the table is lowered, i.e. the motor is working with the expected load. Correspondingly, the locking mechanism does not lock in the opposite direction (the non-locking direction), where the motor is working against the expected load by raising the table. The invention also relates to such a height adjustable table.

In embodiments of the present invention, a motor comprises a controller and an angular position sensor. The controller comprises data acquisition and data processing capabilities and is configured to use the sensor signal to determine angular position, angular velocity, total number of revolutions etc. of the motor shaft.

In combination with other tasks of the controller, it may be configured to control the timing and switching on or off a solenoid which drives the nonrotating locking element. In a phase of operation in which the motor is operating in either direction, and when the controller is instructed to stop the motor while holding said load, the controller may be configured to take action that facilitates a desirable motor lock operation. Instruction to stop may be given by e.g. a user pressing a button or by signaling from an outside control system.

According to the present invention, a certain control scheme may be employed to set and unset the motor lock.

To set the lock, the following may apply:

While the motor is working to move a load, and when an outside intervention, e.g. from a user or an outside control system, instructs the controller that the motor shall stop, the controller is configured to do the following. After stopping the motor rotation, the controller may be configured to check an angular position sensor signal for a short, predetermined time interval: The motor is stopped, yet still switched on. When during said time interval the controller may satisfy that no rotation occurs, the controller is configured to switch off electric power to the motor, the controller as well as the solenoid.

This displaces the nonrotating locking element of the motor lock, thus bringing its locking edge into contact with a rotating locking element in the shape of a locking disc or locking sleeve, where a sharp protrusion of the locking edge will catch a cam on its engageable side, and thus effectively lock the motor against rotation in the locking direction after which the motor may be switched off.

When unsetting the lock, the appropriate controls will be determined according to the rotational direction, which shall take place after unsetting the lock. Here the controls will be different depending on whether the desired working direction after unsetting is intended to be in the locking direction or in the non-locking direction.

When the intended direction is in the non-locking direction, the control is configured to simply switch on the controller, the solenoid, and the motor.

When the intended direction is in the locking direction, the controller is configured to switch on the solenoid, but to not yet start the motor rotating in the locking direction. The controller may be configured, as a next step, to operate the motor to incrementally work in the non-locking direction to create a favorable release of the lock.

The rotation in the non-locking direction shall just be sufficient to ensure that the nonrotating locking element can disengage from the cam of the rotating locking element. As an example, the number of cams on a locking disc or locking sleeve may determine the minimum rotation by the motor in the non-locking direction. Thus, if the number of cams is n, then the minimum rotation implemented by the controller may be 1/n of 360 degrees.

This action ensures that a sharp protrusion on the distal end of the leaf spring will move out of its pressed-up position against the engageable side of the cam. Following this initial increment, the controller is configured to cause the motor to rotate in the locking direction after having ascertained that the lock has been released.

Thus, the following methods for operating an actuator mechanism also serve to summarize the invention:

In an embodiment, the following applies for a method for operating an actuator which comprises an electric motor according one of the above embodiments. The method is operational to stop and lock the motor while operating the actuator mechanism. The method comprises the following steps:
- use the actuator mechanism to move a load,
- Provide, while the motor is working to move the load, a signal to the controller indicating that the motor shall stop,
- Stop the rotation of the electric motor using electric controls,
- Continually check the angular position sensor signal during a predetermined time interval,
- Keep the motor in a stopped state, yet still electrically switched on, and
- When during said time interval, the controller is able to determine that no rotation occurs, switch off electric power to the motor, the solenoid, as well as the motor control system.

In an embodiment, the following applies for a method for operating an actuator which comprises an electric motor according to one of the above embodiments. The method is operational to unlock and start the motor and next to operate the actuator mechanism in the locking direction. The method comprises the following steps:
- while electric power to the motor, the motor control system, as well as the solenoid is switched off, provide a signal to the actuator to initiate operation in the locking direction by e.g. a user pressing a button or by signaling from an outside control system.
- Switch on power to the controller.
- Switch on the solenoid, but not yet start the motor rotating.
- Use the actuator mechanism to work incrementally in the non-locking direction in order to unlock by having the controller turn the motor at least one increment of rotation in the non-locking direction, thereby ascertaining that the locking mechanism has been released.
- Following this initial increment, let the controller cause the motor to rotate in the locking direction.

Figure 1B:
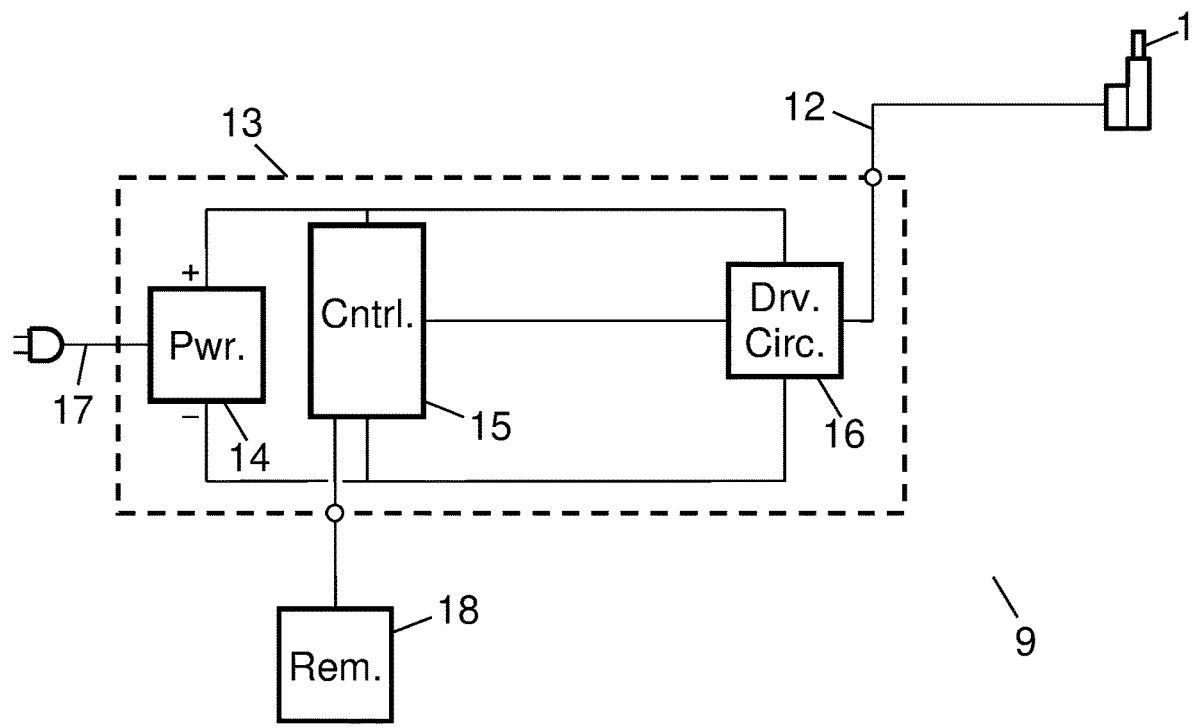
Figure 2A:
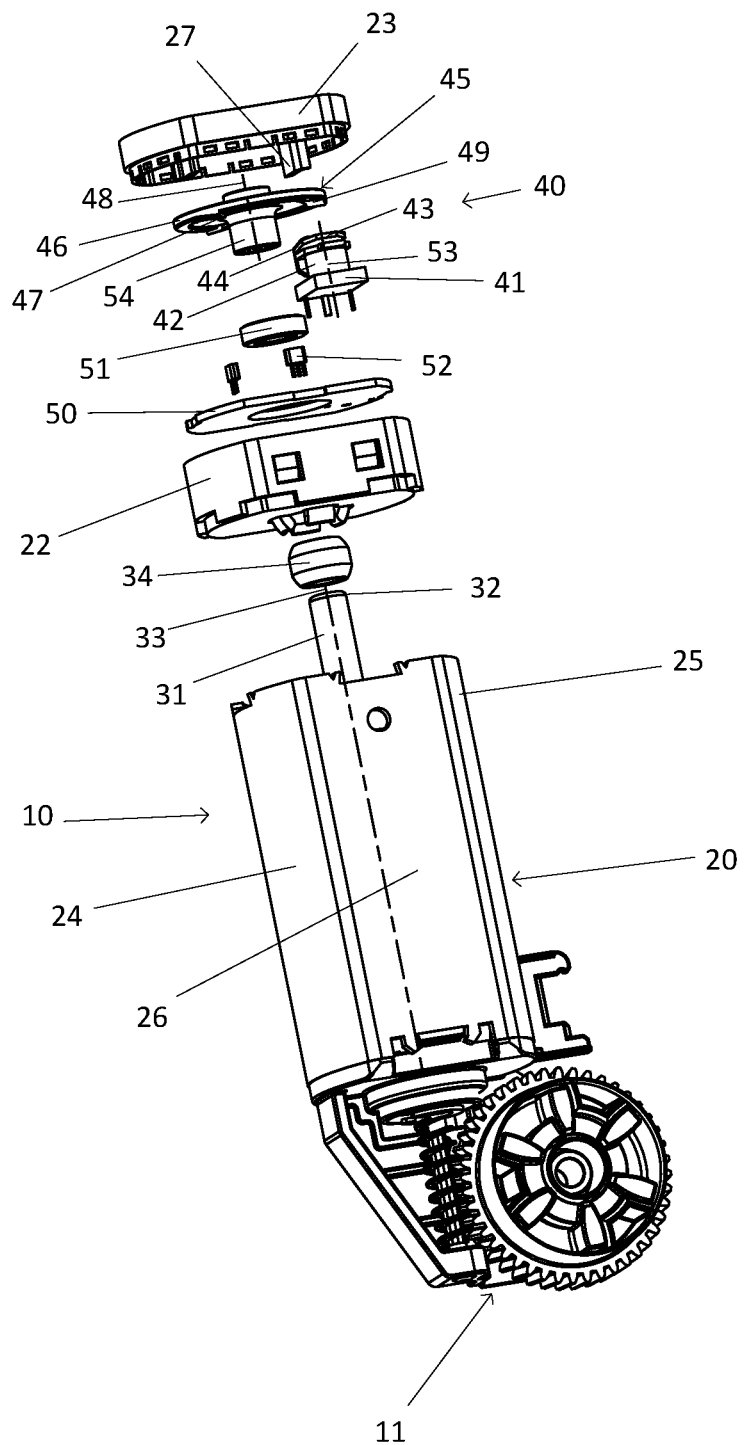
Figure 2B:
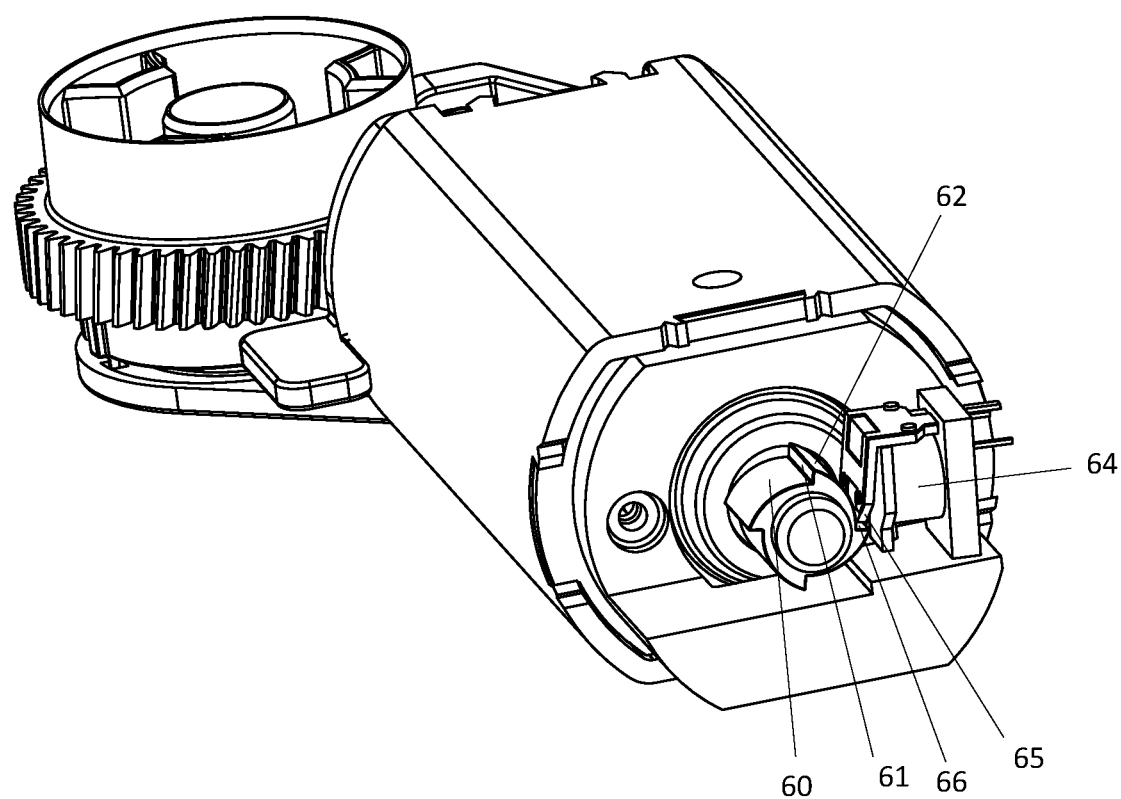
Figure 3:
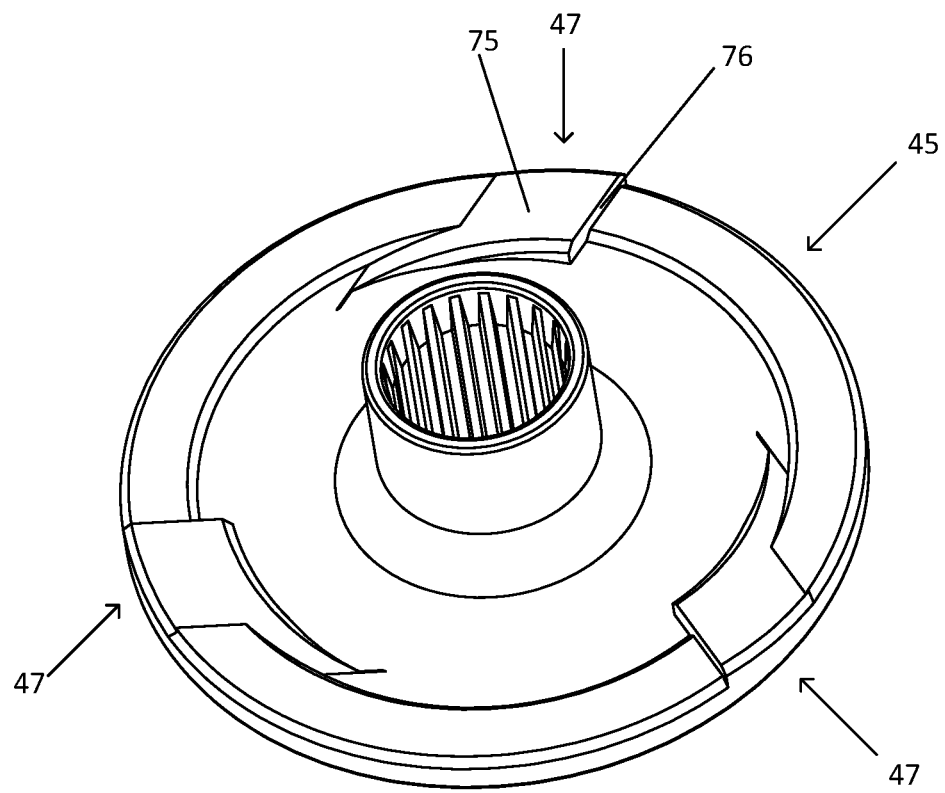
Figure 4A:
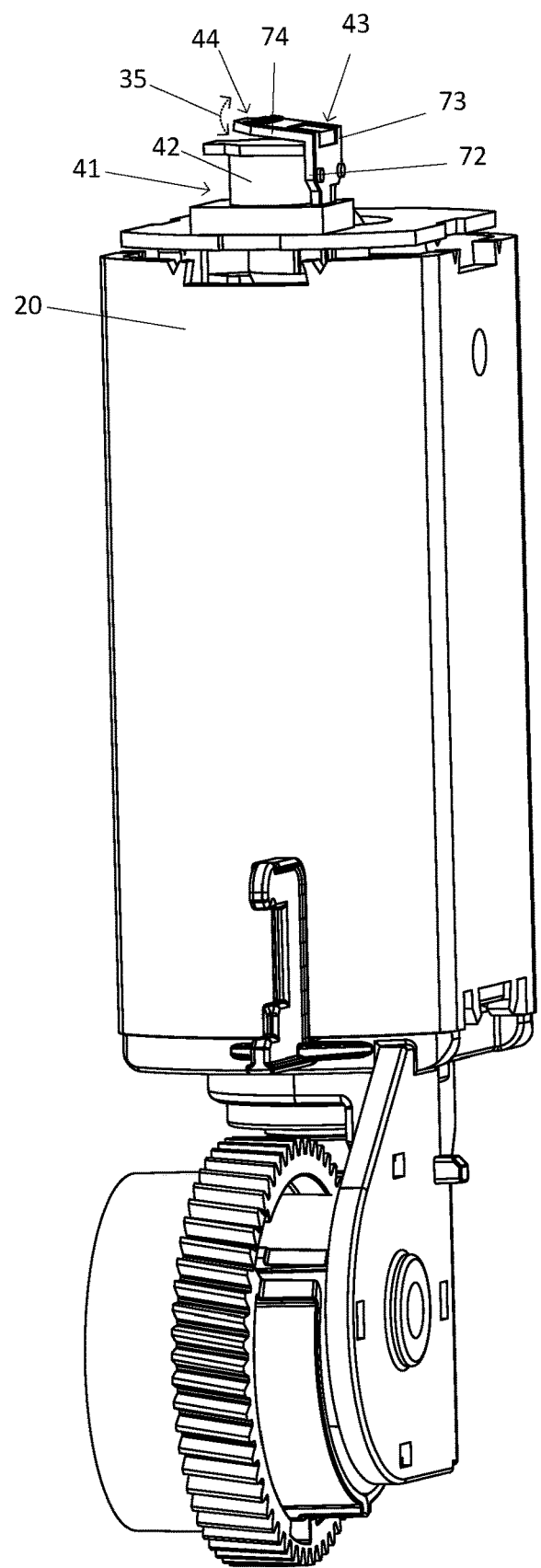
Figure 4B:
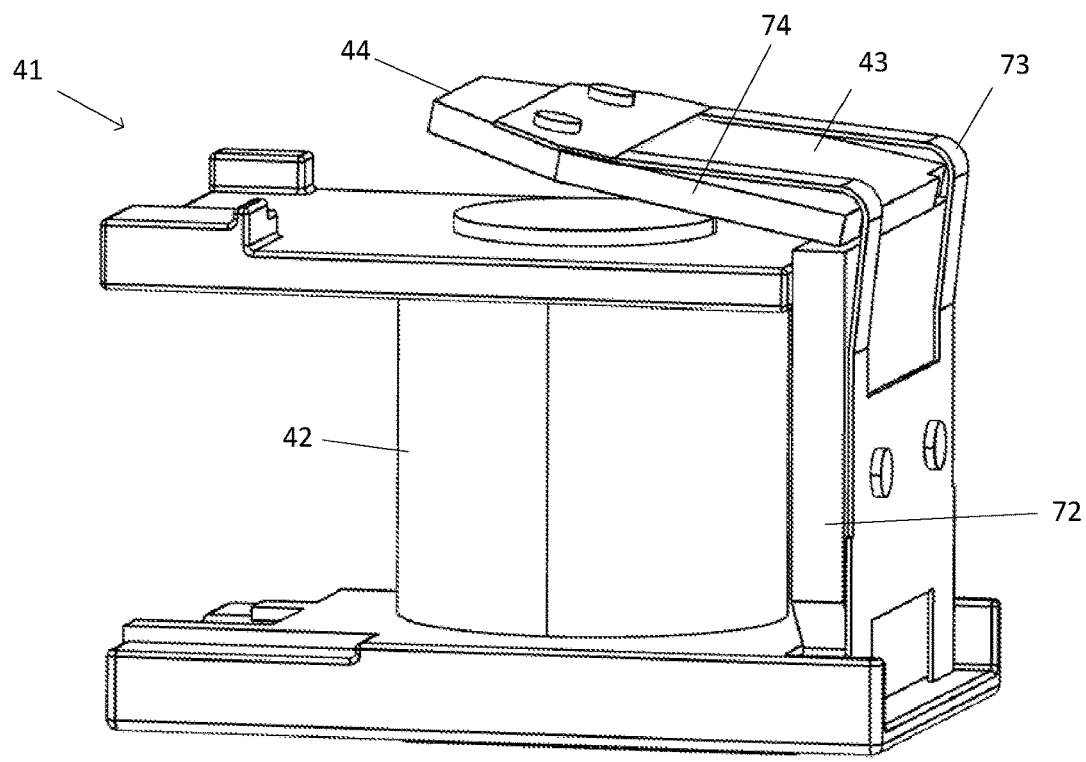
Figure 4C:
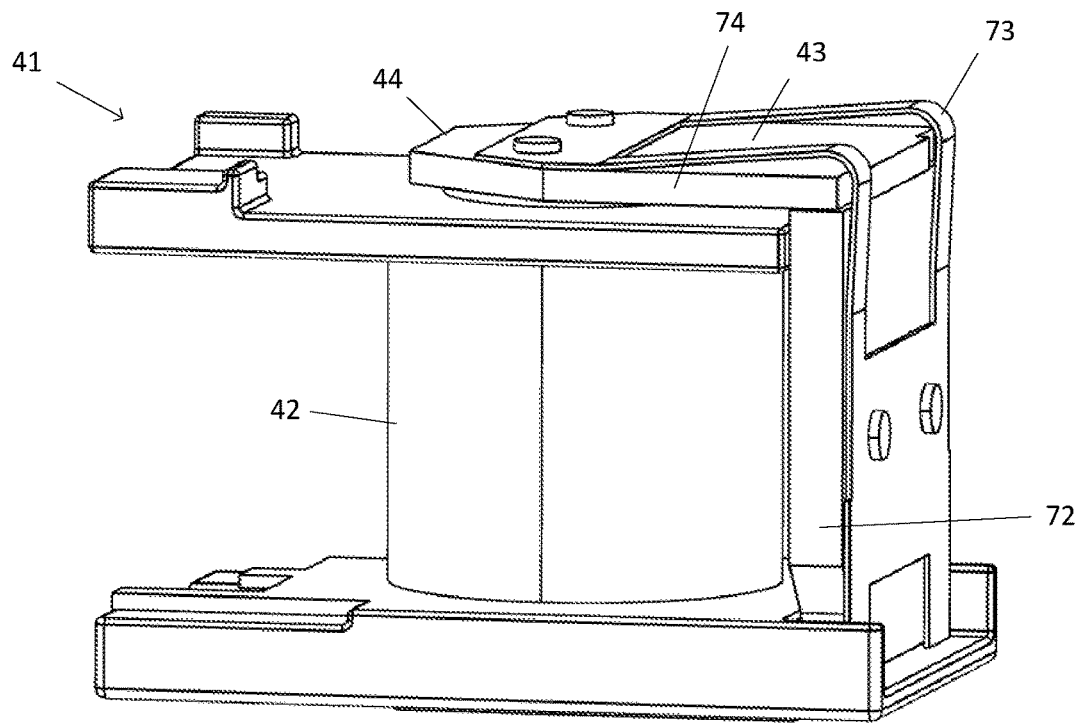
Figure 5:
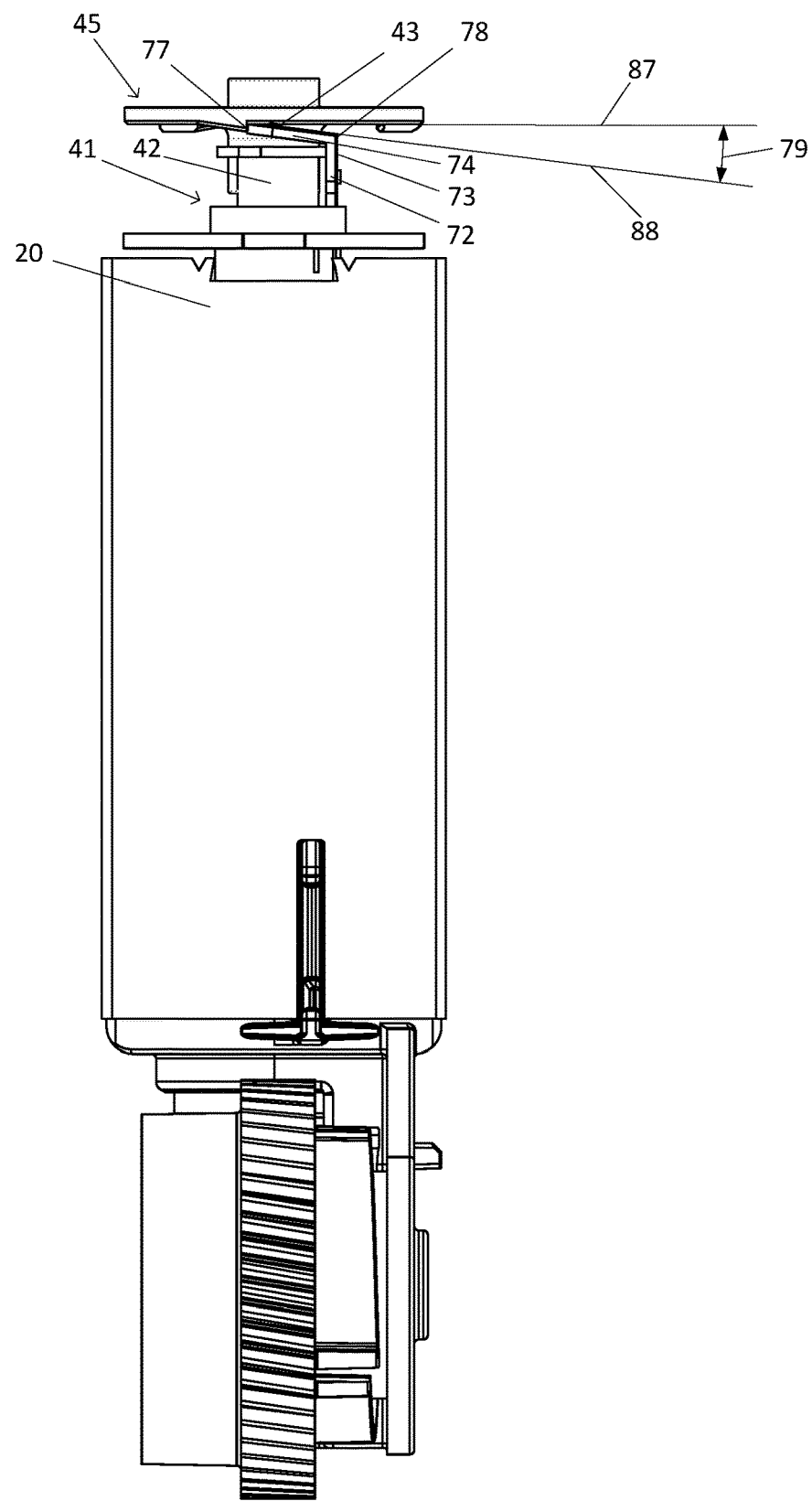
Figure 6A:
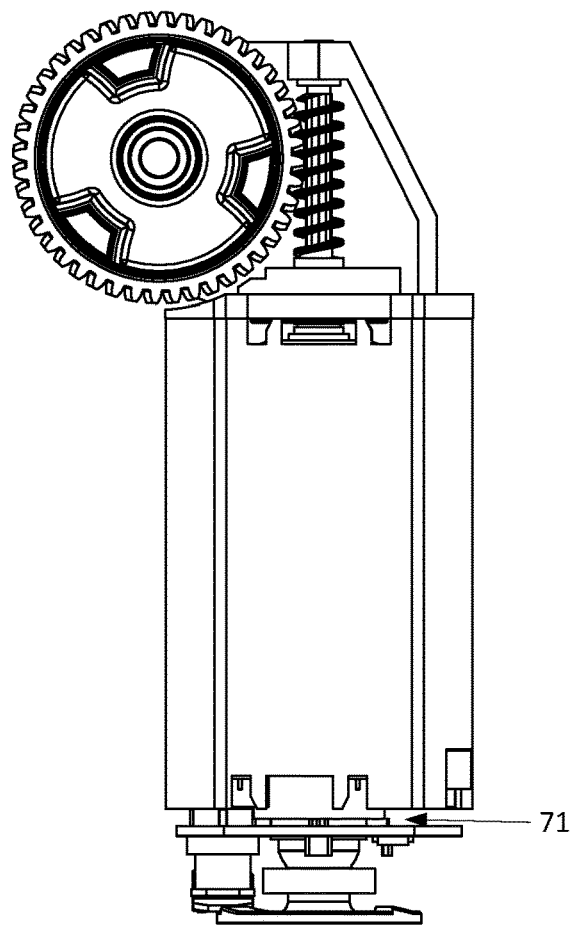
Figure 6B:
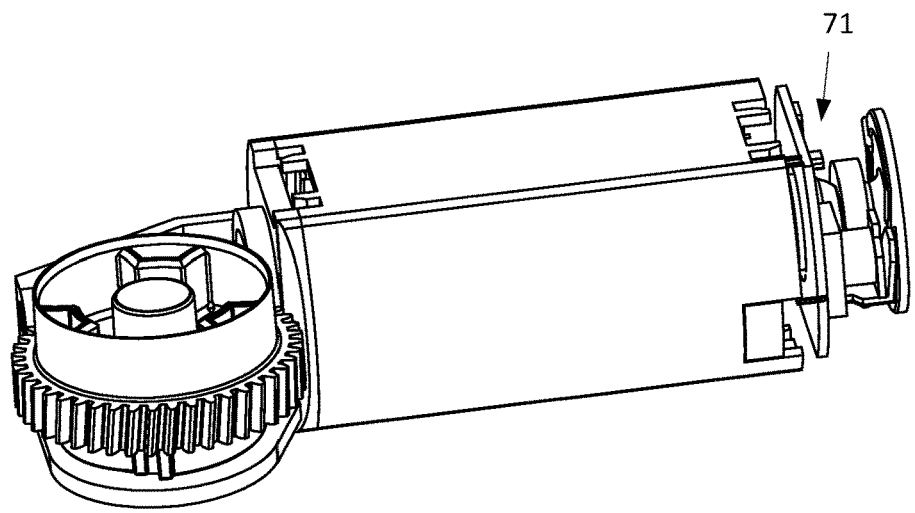
Figure 7A:
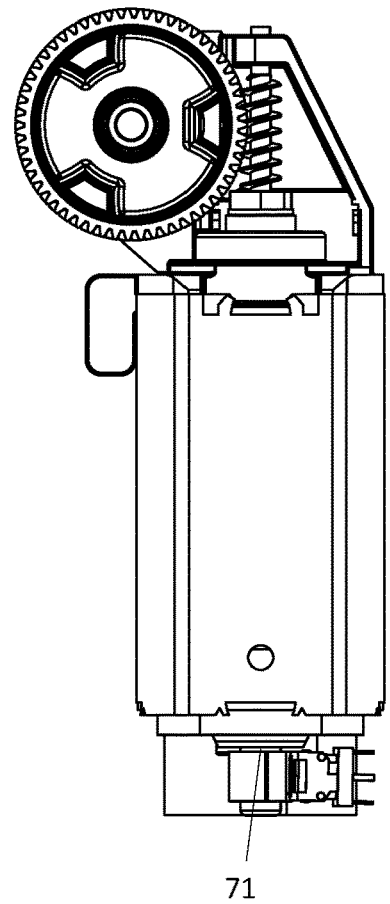
Figure 7B:
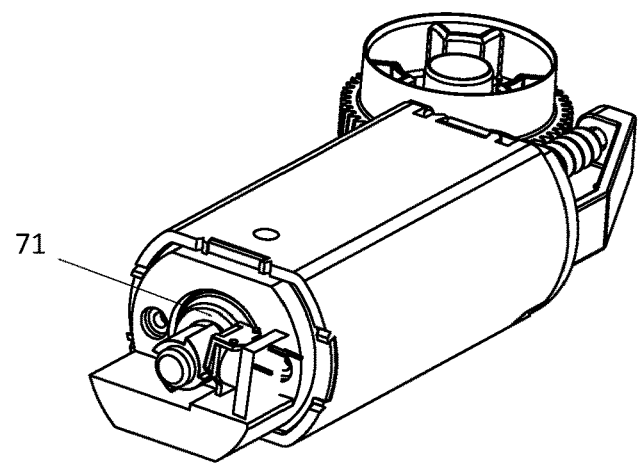
Figure 8A:
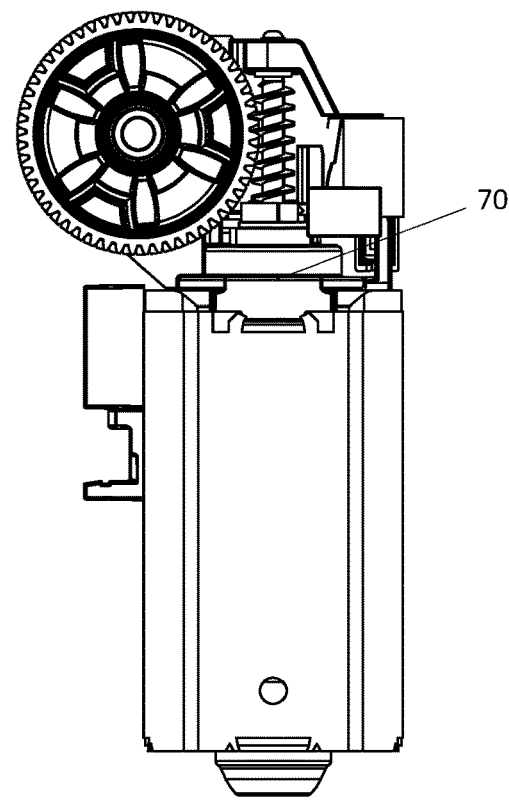
Figure 8B:
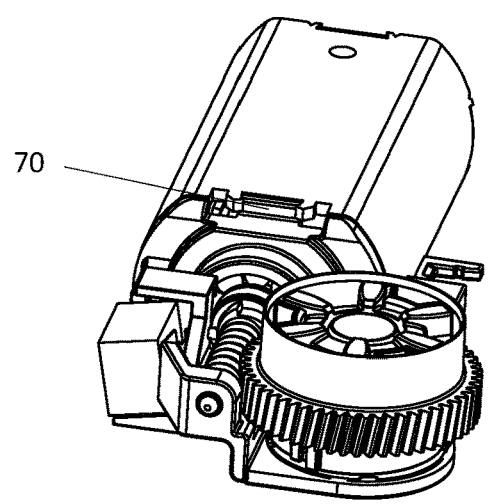
Figure 9A:
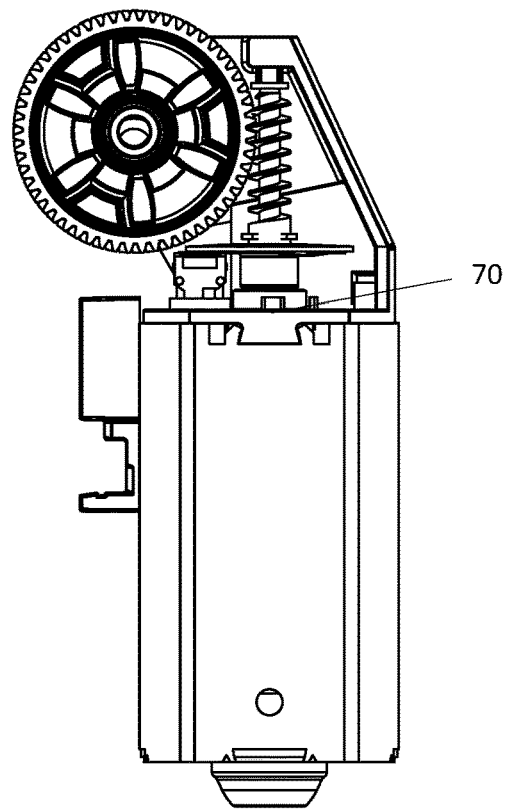
Figure 9B:
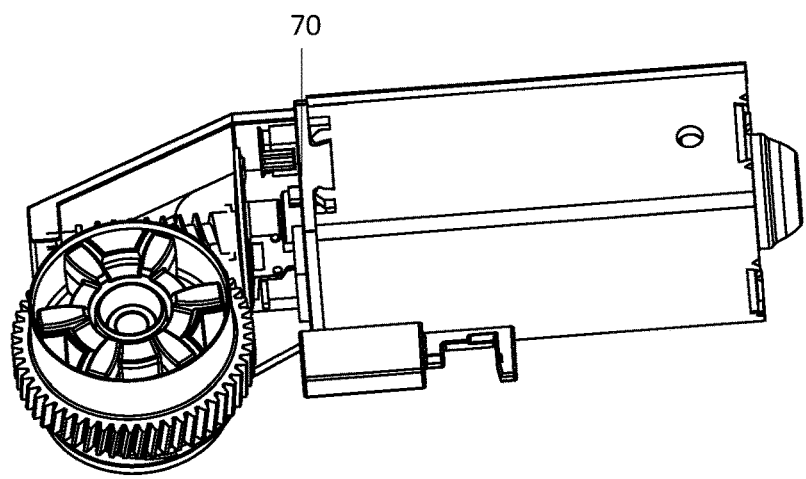
Figure 10:
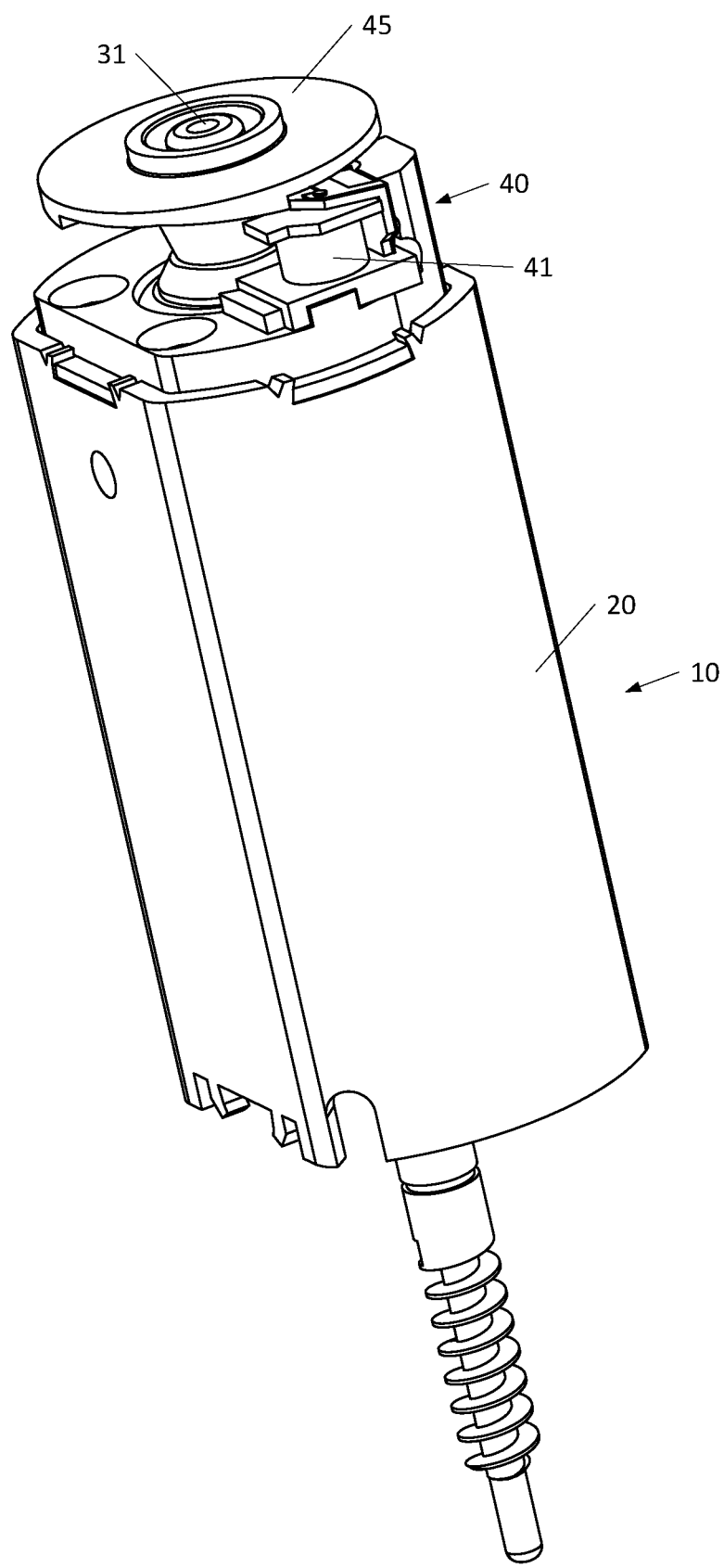
Figure 11:
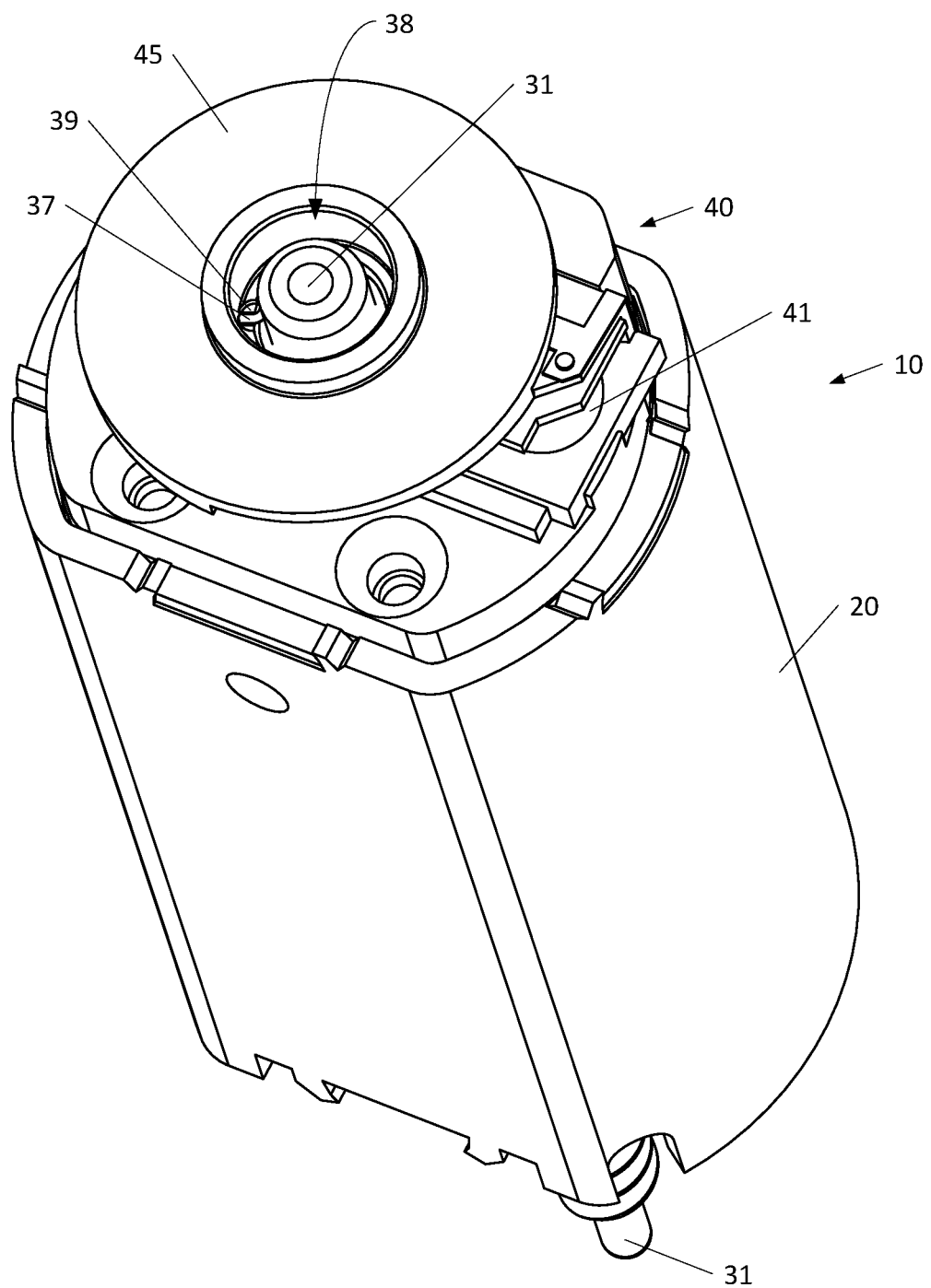
Figure 21:
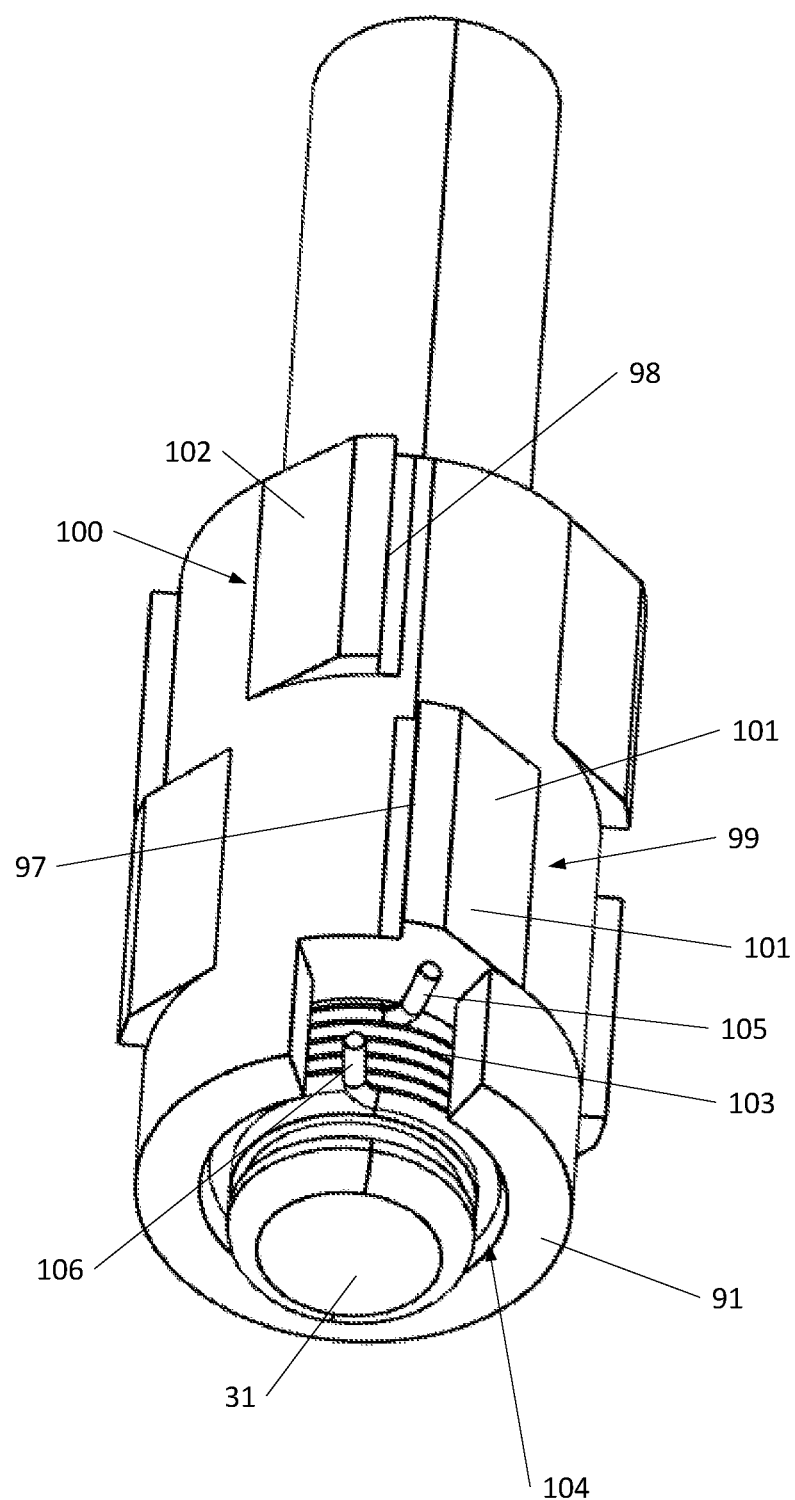
Figure 22:
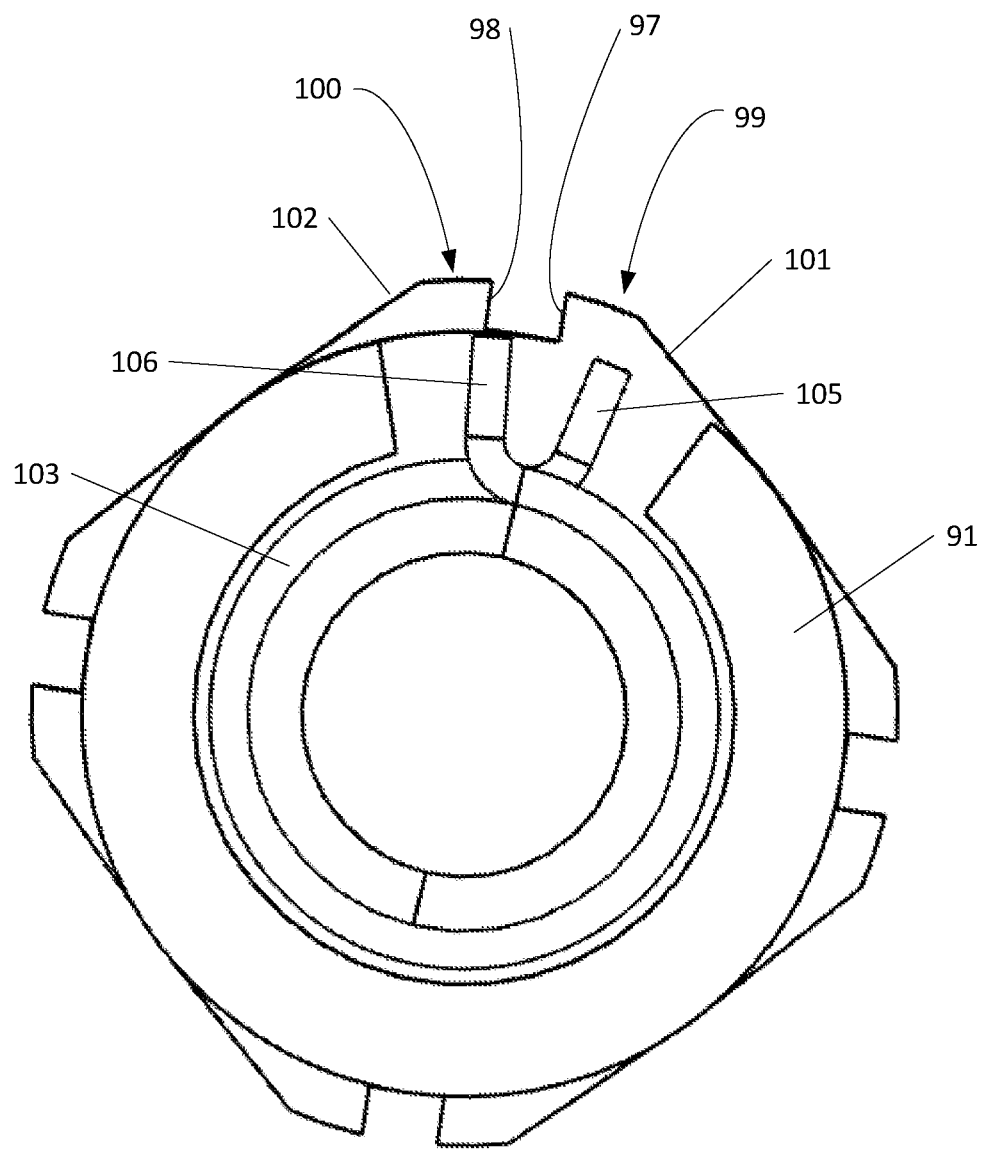
Figure 23:
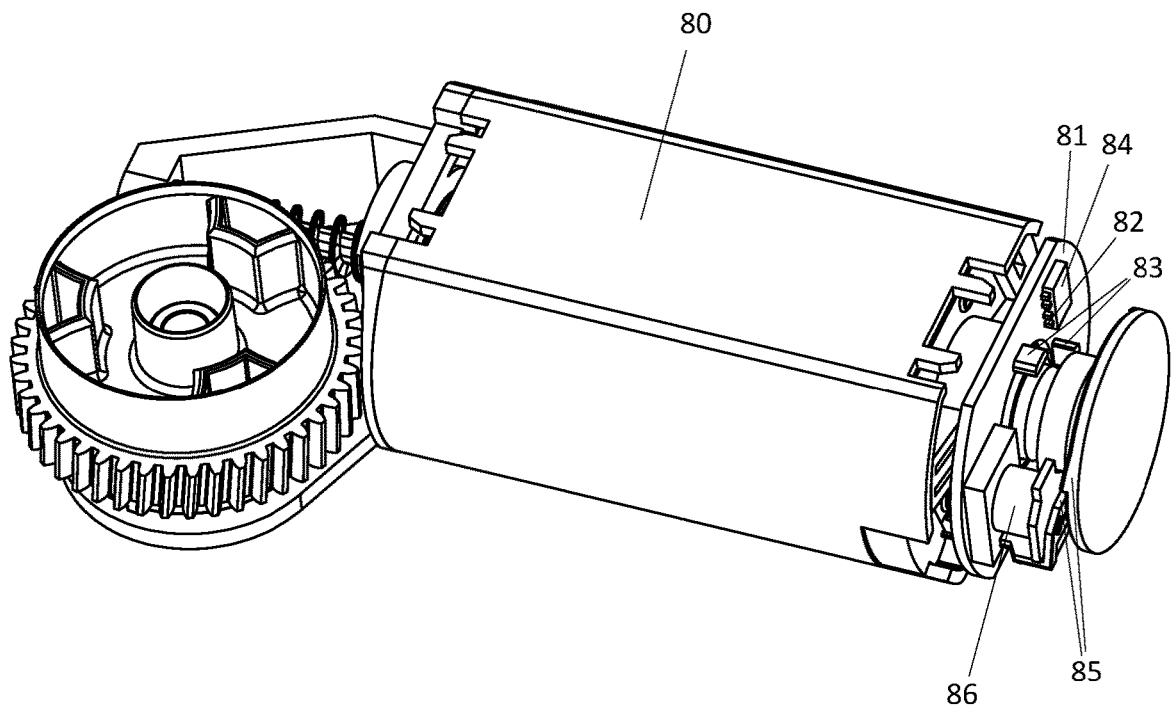
Figure 24:
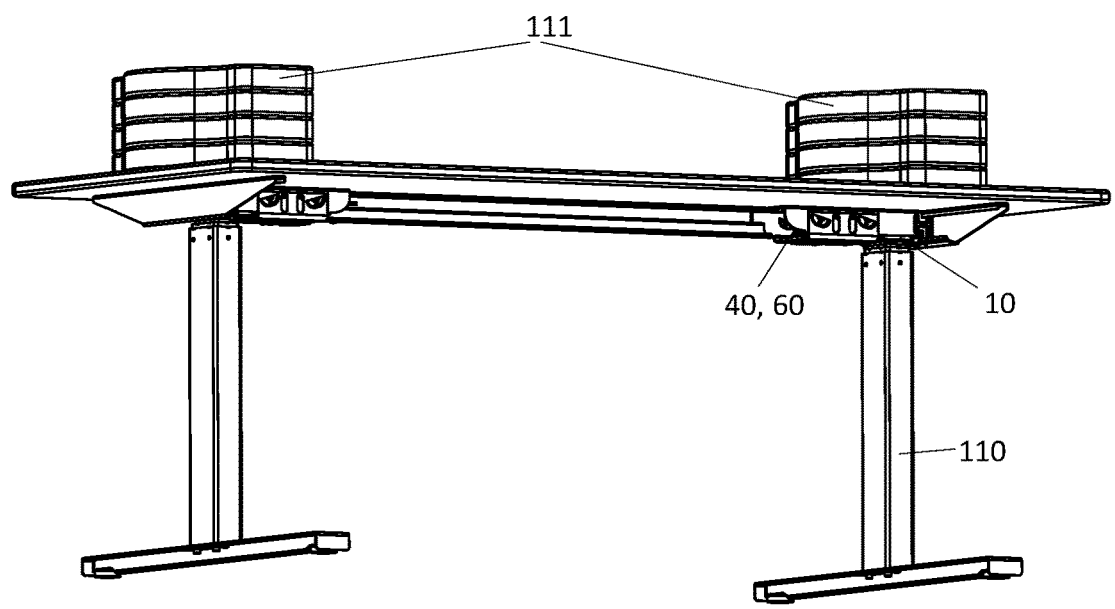

These and other features and advantages of the invention will be clear from the below detailed description of the invention, in which FIG. 1a schematically shows an example of a linear actuator, FIG. 1b shows an example of an actuator system, where a linear actuator is controlled by a control box, FIG. 2a is a partially exploded view of a first embodiment of the motor in a linear actuator according to the invention, FIG. 2b is a perspective view of a second embodiment of the motor in a linear actuator according to the invention, FIG. 3 is a perspective view of a rotating locking element, FIG. 4a is a perspective view of an electromechanical solenoid, FIGS. 4b and 4c show further details of an electromechanical solenoid, FIG. 5 is a side view of a locking mechanism when engaged, FIGS. 6a and 6b shows a side view and a perspective view of a first embodiment of the motor according to the invention, FIGS. 7a and 7b shows a side view and a perspective view of a second embodiment of the motor according to the invention, FIGS. 8a and 8b shows a side view and a perspective view of a third embodiment of the motor according to the invention based on the first embodiment, FIGS. 9a and 9b shows a side view and a perspective view of a fourth embodiment of the motor according to the invention based on the second embodiment, FIGS. 10 to 13 shows a fifth embodiment of the electric motor with a locking mechanism based on the first embodiment comprising a torque limiting clutch, FIGS. 14 to 18 shows a sixth embodiment of the electric motor with a locking mechanism based on the second embodiment comprising a torque limiting clutch, FIGS. 19 to 22 shows a seventh embodiment of the electric motor with a locking mechanism based on the second and sixth embodiments, FIG. 23 shows a perspective view of the back end of a motor according to the first embodiment of the invention, shown with the motor housing removed, and FIG. 24 shows a height-adjustable table with linear actuators, where the table is under load by weights placed on top of it.

The FIGS. 1 to 9 shows motor embodiments with worm gear mechanisms. This is for illustrative purposes only. The invention is not limited to a motor driving any particular device.

DETAILED DESCRIPTION OF THE INVENTION

FIG. 1a schematically shows an example of a linear actuator 1. The linear actuator 1 comprises an electric motor 10, a transmission or reduction gear 3, typically with several stages, a spindle 4 having a thread 5, a spindle nut 6 engaging the thread 5 and a tube-shaped activation element 7. At the end of the activation element 7, a mounting bracket 8 for mounting the linear actuator 1 to e.g. a carrying element is arranged. The spindle nut 6 is directly or indirectly secured against rotation. In some linear actuators, the spindle nut is connected directly to e.g. a carrying element without the use of an activation element. When the spindle 4 is rotated by the motor 10, the spindle nut 6 moves along the spindle 4, thus transforming the rotation to a linear movement of the spindle nut 6 and/or the activation element 7 between two end positions.

Further, the linear actuator 1 comprises an electromechanical locking mechanism 40 arranged on the motor 10. This locking mechanism will be described in more detail in the following. It is noted that with some motor types, the electric motor 10 can drive the spindle 4 directly, so that the transmission 3 can be avoided. Although other types of electric motors may be used, the electric motor 10 is typically a reversible electric DC motor.

Typically, a linear actuator is used in an actuator system controlled by a control box. An example of such an actuator system 9 is illustrated in FIG. 1b. Via a cable 12, the linear actuator 1 is connected to a control box 13 that comprises at least a power supply 14, a controller 15 and a driver circuit 16 for the linear actuator 1. The driver circuit 16, and thus also the electric motor 10 of the actuator 1, is controlled by control signals from the controller 15. Typically, the controller 15 comprises a microcomputer. The control box 13 is normally placed on the equipment on which the linear actuator 1 is used. This equipment can represent any one of several different applications, such as trucks, agricultural machinery, industrial automation equipment, hospital and care beds, leisure beds and chairs, tables or other articles of furniture with adjustable height and several other similar applications. The power supply 14 is typically connected to a mains AC supply net with a power cable 17. Further, the control box 13 may be connected to a remote control 18 allowing the operation of the linear actuator 1 to be controlled by a person in the vicinity of the actuator. The connection between the remote control 18 and the control box 13 may be a wired connection as shown in FIG. 1*b*, but a wireless communications system, such as a radio link or an infrared link, may also be used. A control box may also be configured to control an actuator system having a plurality of linear actuators. The control box then comprises a driver circuit for each linear actuator. Each driver circuit, and thus also the electric motors of the actuators, are controlled individually by control signals from the controller, which means that some or all of the actuator motors may be running simultaneously.

FIG. 2*a* is a partially exploded view which shows a first embodiment of the motor 10 with the locking mechanism 40 in a linear actuator according to the invention.

The electric motor 10 is equipped with an electro-mechanical locking mechanism 40, where the motor 10 comprises a stator and a rotor (not shown).

The stator is attached to a motor housing 20. Said motor housing 20 comprises an elongated housing part, the exterior of which, by example, displays a flattened geometry and is shaped with two parallel planar surfaces 26, where said planar surfaces are shown connected by arc-shaped surfaces 24, 25 at each side. A motor 10 with such a flattened outer geometry may be desirable where there are space constraints, such as e.g. in a linear actuator. The motor housing 20 further comprises a rear housing part 22 and an end cover 23.

The rotor comprises a motor shaft 31, said motor shaft 31 at one end comprises a projecting part at a front end adapted to serve as an output end (not shown). In the example of FIG. 2*a*, the output end is connected to drive a worm of a worm gear mechanism 11. At the rear end 32, the motor shaft 31 is supported by a bearing 34.

The motor 10 is adapted to be electrically controlled to selectively switch between either rotating in a clockwise direction or rotating in a counterclockwise direction.

The locking mechanism 40 comprises an electromechanical solenoid 41 immovably attached to the motor housing 20, 22, 23. The electromechanical solenoid 41 is an electromechanical transducer comprising a coil 42 and a pivot arm 43. In the following, the electromechanical solenoid will also be referred to as just the solenoid. It is noted that also other types of electromechanical transducers can be used instead of the electromechanical solenoid 41.

The locking mechanism 40 further comprises a rotating locking element 45, shown in this embodiment as a disc-shaped locking element attached directly or indirectly to the motor shaft 31.

The locking mechanism 40 further comprises a nonrotating locking element 44 and FIG. 2*a* shows that the rotating locking element 45 and the nonrotating locking element 44 are arranged to engage, the engagement being selectively controllable by the solenoid 41.

The motor shaft 31 comprises a longitudinal axis 33. The solenoid 41 comprises a coil 42 and the solenoid coil 42 comprises a longitudinal axis 53. The motor 10 in the embodiment of FIG. 2*a* shows that the motor shaft longitudinal axis 33 is parallel to but not coinciding with the coil longitudinal axis 53. The two axes are thereby offset from each other.

The rotating locking element 45 comprises a longitudinal axis 48. As shown in FIG. 2*a*, the longitudinal axis 33 of the motor shaft 31 and the longitudinal axis 48 of the rotating locking element 45 are coincident. The rotating locking element 45 is co-rotating with the motor shaft 31—their rotational movement is identical.

FIG. 2*a* further shows a motor 10 where the rotating locking element 45 comprises at least one cam 47 (three cams shown) projecting in a direction towards the solenoid 41, and the nonrotating locking element 44 of the pivot arm 43 projecting in a direction towards the rotating locking element 45. The nonrotating locking element 44 is arranged to enter a locking position when it engages with the at least one cam 47. This is enabled when electrical current to the coil of the solenoid 41 is switched off.

The rotating locking element 45 comprises a surface 49 facing towards the pivot arm 43.

FIG. 2*a* further shows that the base of the solenoid 41 is fixed to a printed circuit board 50 which in turn is fixed to the rear housing part 22. At its opposite top side of the coil, the nonrotating locking element 44 is supported by a support member 27, thereby stabilizing the solenoid 41 against tilting and shearing forces. The support member 27 is arranged to support the pivot arm 43 at its hinged end. The support member 27 is formed as an integral part of the end cover 23.

In the embodiment of an electric motor 10 of a linear actuator according to the invention shown in FIG. 2*a*, it is seen that the motor 10 comprises a rotating member 51 which facilitates detection of rotation. Said rotating member 51 is arranged on the motor shaft 31 and co-rotates therewith. The rotating member 51 can be of various configurations, such as a ring magnet for a hall sensor or an optical disc for an optical sensor. The electric motor 10 further comprises at least one rotation sensor 52 such as a hall sensor or optical sensor, said sensor 52 being directly or indirectly fixed to the housing. FIG. 2*a* shows two hall sensors which may be preferable in some applications.

The at least one rotation sensor 52 is mechanically and electrically connected to a printed circuit board 50, the board being directly or indirectly fixed to the housing 20, 22, 23, and said printed circuit board 50 also holds the solenoid 41 and provides electrical connections thereto. This is nevertheless not the only option. It is equally feasible that the rotation sensors 52 and the solenoid 41 may be independently attached and connected.

FIG. 2*b* shows a second embodiment of the invention in which the rotating locking element, of the locking mechanism 60, is shaped as a locking sleeve 63, where at least one cam 61 (four cams shown) is positioned on an otherwise essentially circularly curved surface 62 of the sleeve facing towards the solenoid 64. The locking sleeve 63 is arranged in proximity of the solenoid 64 to allow the nonrotating locking element 65 to interact with the engageable side 66 of the at least one cam 61.

This second embodiment additionally comprises an end cover which is not shown in FIG. 2*b*.

The motor shaft 31 comprises a longitudinal axis. The solenoid 64 comprises a coil, and the solenoid coil comprises a longitudinal axis. The electric motor 10 in the embodiment of FIG. 2 shows that the motor shaft longitudinal axis is orthogonal to the coil longitudinal axis. The two axes are thereby offset from each other.

Referring to the first embodiment in FIG. 2a, FIG. 3 illustrates the rotating locking element 45 shaped as a locking disc, where the at least one cam 47 (three cams shown) is positioned on an otherwise essentially planar side of the disc facing towards the solenoid 41. The locking disc 45 is arranged in proximity of the solenoid 41 to allow the nonrotating locking member 44 to interact with the steep side of the cams 47.

FIG. 3 shows that each cam 47 has a non-engageable side 75 (shown here as a sloping side) opposite an engageable side 76 (shown here as a steep side), with the steep side being approximately orthogonal to the surface of the rotating locking element 45. The engageable side may also have other forms that are able to lock with the nonrotating locking member 44. It is noted that the non-engageable side 75 cannot be engaged because it points away from the nonrotating locking member 44. It is not required to be sloping. It would be equally non-engageable even if it were not sloping. As will be described below, it is the arrangement and angularity of the pivot arm which makes the non-engageable side 75 non-engageable. FIG. 3 illustrates that the rotating locking element is designed with a small size and reduced mass but high strength in mind when comparing to conventional cams, which strength is achieved by designing the non-engageable side 75 with a large footprint.

The electric motor 10 is unidirectionally lockable using the locking mechanism 40 against rotation, locking only in one rotational direction: either the clockwise direction or the counterclockwise direction. This is achieved by adapting the topographical configuration of a ring-shaped area 46 located on a surface of the rotating locking element 45 such that it is only when rotation is attempted in one of the directions of rotation that the topography of the ring-shaped area 46 lockingly engages with the nonrotating locking element 44.

The rotating locking element 45 comprises an axis of rotation 48 shown in FIG. 2a.

The locking mechanism 40 of the first embodiment comprises, as shown in FIG. 4a, an electromechanical solenoid 41 immovably attached in relation to the motor housing 20, 22, 23, where the solenoid 41 comprises a coil 42, a yoke 72, which may be formed as an angular bracket, and a movable armature 74 in the form of a pivot arm 43. Further details of an example of an electromechanical solenoid 41 are shown in FIGS. 4b and 4c.

The armature 74 shall be made of a magnetic material. The pivot arm 43 carries a nonrotating locking element 44 formed at the distal end of the armature 74. The armature 74 is hinged to the yoke 72 and held in place by a leaf spring 73 attached to the yoke 72 and bent to approximately 90 degrees, so that when the electromechanical solenoid 41 is not energized the pivot arm 43 and thus the nonrotating locking element 44 is kept in its projected position. This situation is shown in FIG. 4b. When an electric current is passed through the coil 42 it generates a magnetic field that activates the armature 74 by attracting it towards the coil 42 with a magnetic force that exceeds the force provided by the leaf spring 73. This means that the pivot arm 43 and thus the nonrotating locking element 44 is brought to its retracted position. This situation is shown in FIG. 4c. When the current through the coil is switched off again, the pivot arm 43 is returned to its projected position by the force provided by the leaf spring 73.

It is noted that due to the gear ratio of a linear actuator, i.e. caused by the spindle 4 as well as the transmission or reduction gear 3, a strong force applied to the linear actuator in e.g. a height adjustable table will be reduced to a considerably lower force at the motor shaft of the actuator. Thus even with a heavy load on the actuator it can be locked with the use of a locking mechanism with a small electromechanical solenoid such as the one shown in FIGS. 4a and 4b using a leaf spring 73 as the spring element.

In an embodiment, the electromechanical solenoid can thus be implemented by a subminiature signal relay. In that case, the contact set of the relay may either be omitted, left unused or used for providing a feedback signal indicating whether or not the locking mechanism is locked. As an example of such a feedback signal, it can be mentioned that when the locking mechanism is to be released after having been locked, the coil will be energized. However, the nonrotating locking element may be pressed up against the engageable side of the cam and thus having difficulty in disengaging. In that case, a relay contact will indicate that the nonrotating locking element is still in its projected position although the coil is energized, and the motor can be controlled to rotate incrementally in the non-locking direction to release the lock before an intended rotation in the locking direction can be started. As another example, it can be mentioned that when the coil is de-energized and the nonrotating locking element is thus in its projected and locked position, a relay contact may connect (i.e. short circuit) the motor terminals. This will increase the cogging torque of the motor, so that in case of a mechanical defect in e.g. the rotating locking element the resulting speed of the motor in the locking direction will at least be reduced.

The solenoid 41 is adapted to be electrically controlled to selectively switch the nonrotating locking element 44 between a projected and a retracted position, as indicated with the dotted line 35. When the electromechanical solenoid 41, 64 is not energized, the spring element or leaf spring 73 will keep the pivot arm 43 and thus the nonrotating locking element 44 in its projected position engaging the rotating locking element 45, 63. Thus, when no current flows though the winding of coil 42, the nonrotating locking element assumes its projected position.

Magnetizing the coil 42 with a current causes the armature 74 to be moved closer to the coil 42 by elastically bending the leaf spring 73 and the pivot arm 43 towards the coil 42, thereby putting the nonrotating locking element 44 into its retracted position.

FIG. 5 shows the principle of engagement between the rotating locking element 45 (shown here as a disc) and the nonrotating locking element 44 in the first embodiment of the invention. In the figure, electrical current to the solenoid is switched off and the pivot arm 43 is in its projected position.

FIG. 5 further illustrates that the nonrotating locking element 44 is a distal end of the armature 74.

The armature 74 of pivot arm 43 is supported against tilting and shearing forces by a support member 27 (see FIG. 2a) immovably attached to the housing 20, 22, 23 at a point 78.

In FIG. 5, 77 signifies a point of engagement between the rotating locking element 45 and the nonrotating element 44. If an outside load would act to attempt to rotate the disc 45 in the direction moving point 77 to the right as seen in the figure, this would be effectively prevented by the engagement between the pivot arm 43 and the engageable side 76 of the cam 47.

If, however, an outside load would attempt to rotate the rotating locking element or the disc 45 in the direction moving point 77 to the left as seen in the figure, this would be possible even with the pivot arm 43 in its projected position. The pivot arm 43, and thereby the nonrotating locking element 44, would slide past the cams due to the flexibility of the pivot arm 43, given that said outside load would be large enough.

FIG. 5 further shows that in its projected position, the armature 74 of the pivot arm 43 abuts the engageable side 76 (see FIG. 3) of the cam 47, where the armature 74 forms an angle 79 with the lower side of the rotating locking element 45. A locking and load-holding force will be transferred as a compressive force in the armature 74 of the pivot arm 43 to be subsequently, in most part, transferred to the support member 27 (see FIG. 2*a*).

By analogy, in the second embodiment according to FIG. 2*b*, the cams 62 reside on a curved surface, and a tangent thereto in a position of an engageable side 61 of a cam will, when positioned in an analogous arrangement to the one shown in FIG. 5, also form an angle with the armature 74 of the pivot arm. In FIG. 2*b*, where the rotating locking element 63 is shaped as a sleeve and where the longitudinal axis of the solenoid coil is orthogonal to the longitudinal axis of the motor shaft 31, it is then apparent that a locking and load-holding force will also be transferred as a compressive force in the armature of the pivot arm.

Generally, the load-holding forces in the embodiments shown in FIGS. 2*b* and 5 are both the force transferred from the rotating locking element to the nonrotating locking element.

It is a feature of the present invention that the angle 79 is for instance less than 30 degrees, or less than 15 degrees, or less than 12 degrees, or less than 9 degrees, and for instance larger than 3 degrees or larger than 6 degrees. Keeping angle 79 low has the benefit of allowing the solenoid to be placed in close proximity to the rotating locking element 45. This makes it possible to build a compact motor lock. Arranging the motor lock with such a low angle 79 further ensures unidirectionality of the locking action.

FIGS. 6 to 9 shows four arrangements of electro-mechanical locking mechanisms according to the invention. They are different due to the choice of rotating locking element and the choice of which end of the motor, it is placed at. FIGS. 6*a* and 6*b* show the first embodiment of the electro-mechanical locking mechanism arranged at the rear end 71 having a disc element. FIGS. 7*a* and 7*b* show the second embodiment of the electro-mechanical locking mechanism arranged at the rear end 71 having a sleeve element. FIGS. 8*a* and 8*b* show a third embodiment of the electro-mechanical locking mechanism based on the first embodiment arranged at the output end 70 having a disc element. FIGS. 9*a* and 9*b* show a fourth embodiment of the electro-mechanical locking mechanism based on the second embodiment arranged at the output end 70 having a sleeve element.

In another embodiment of the electro-mechanical locking mechanism according to the invention, the motor comprises a torque limiting clutch arranged between the motor shaft and the rotating locking element.

Additional embodiments will next be described: In general, it is not intended that any overload in terms of excessive torque shall occur on the rotating locking element 45, 63. In certain situations, such as a fault situation, it might nevertheless be found that such a torque overload case will happen. One such fault situation would occur, should the locking mechanism 40, 60 be activated while the electric motor 10 is running. Another overload fault may be where an excessive torque is applied to the motor shaft 31 in a situation where the electric motor 10 has already been stopped and locked via the locking mechanisms 40, 60. Most critically, an overload situation may be characterized as a sudden impact acting on the rotating locking element 45, 63.

Due to its features of small and lightweight components, the locking mechanism 40, 60 may be damaged. In particular, there may be a risk of damaging a cam of the rotating locking element 45, 63 itself or damaging the total structure of the rotating locking element 45, 63 or of damaging the non-rotating locking element 44.

FIGS. 10 to 13 illustrates a fifth embodiment based on the electro-mechanical locking mechanism of the first or fourth embodiment, where the locking mechanism 40, 60 comprises a torque limiting clutch in the form of a coil spring with a multiple turns winding 36 arranged between the motor shaft 31 and the rotating locking element 45. To simplify the illustration of the invention, the worm gear mechanism 11 and the motor housing 22, 23 are not depicted.

Figure 12:
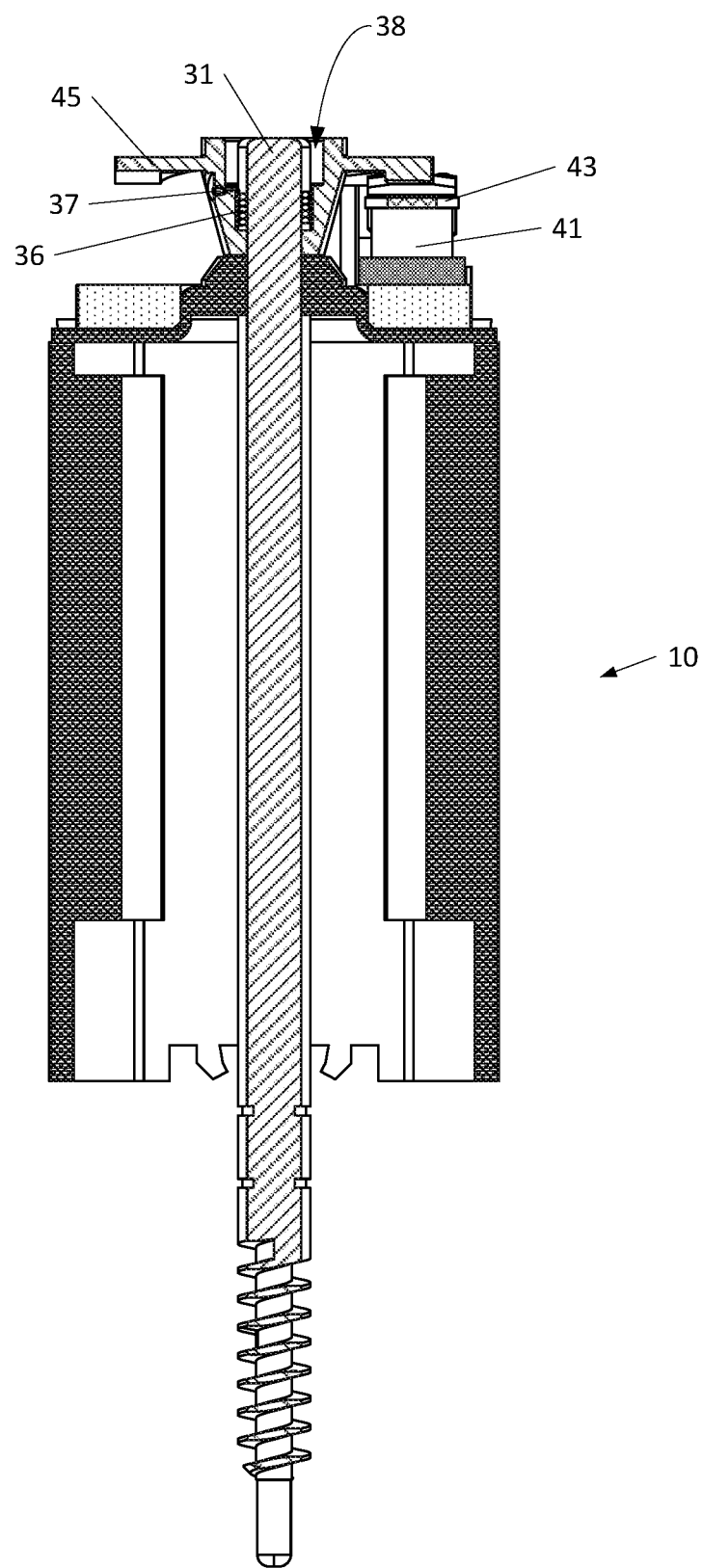
Figure 13:
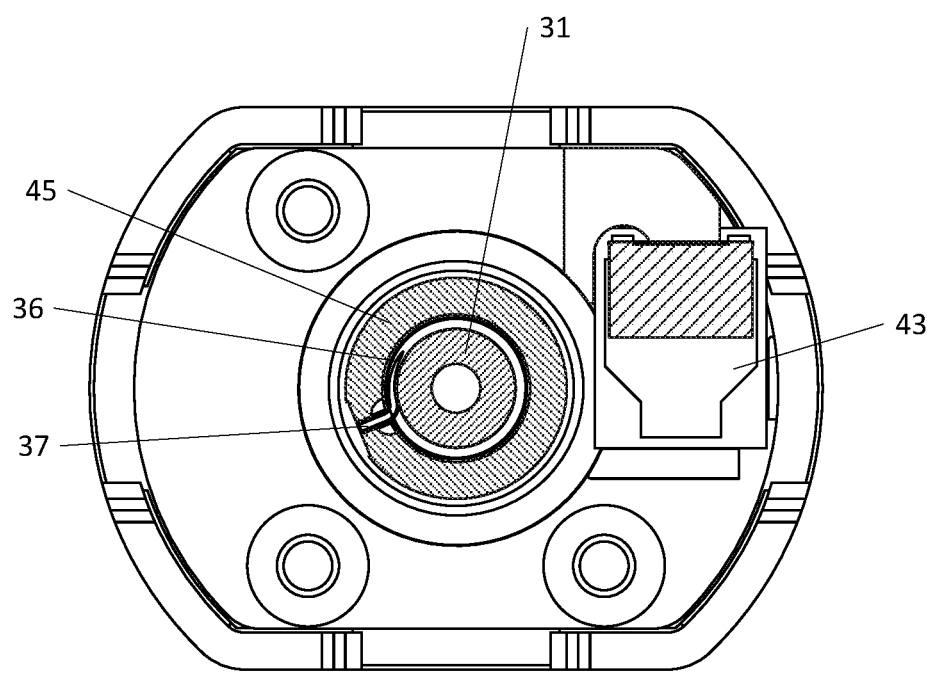

In this fifth embodiment, the locking mechanism 40, 60 operates as described in the first embodiment. The torque limiting clutch in the form of the coil spring 36 is arranged between an inner surface of a cup-shaped or hollow end 38 of the rotating locking element 45, 63 and an outer side of the motor shaft 31, thereby establishing the clutch integrated with the rotating locking element 45, 63. A free end 37 of the coil spring 36 rests in a slot 39 in the rotating locking element 45, 63. The coil spring 36 is with its winding connected to the motor shaft 31, e.g. with a tight grip, such that the rotating locking element 45, 63 rotates with the motor shaft 31, when the nonrotating locking element 44 is in a retracted position. As seen in FIG. 12, the rotating locking element 45, 63 surrounds a part of the motor shaft 31, but can rotate relative to it, and is thereby only in driving connection via the coil spring 36.

In normal operation, the coil spring 36 will not slide on the motor shaft 31. The grip of the coil spring will be adjusted to be strong enough to keep such sliding from happening. The friction between coil spring 36 and motor shaft 31 will be large enough to avoid any sliding in normal operation.

Only in the event of a fault situation, when an exceedingly large torque may be exerted on the rotating locking element 45, 63, will the torque cause a sliding to take place between the coil spring 36 and motor shaft 31. Thereby, the torque limiting clutch essentially anticipates and avoids damage on the locking mechanism 40, 60.

When the nonrotating locking element 44 is in a projected position, the rotating locking element 45, 63 is kept in a non-rotating position, i.e. held against rotation. The same is true for the motor shaft 31 which, via the rotating locking element 45, 63, is held against rotation, whereby the electric motor 10 is unidirectionally locked in either the clockwise direction or the counterclockwise direction.

Figure 14:
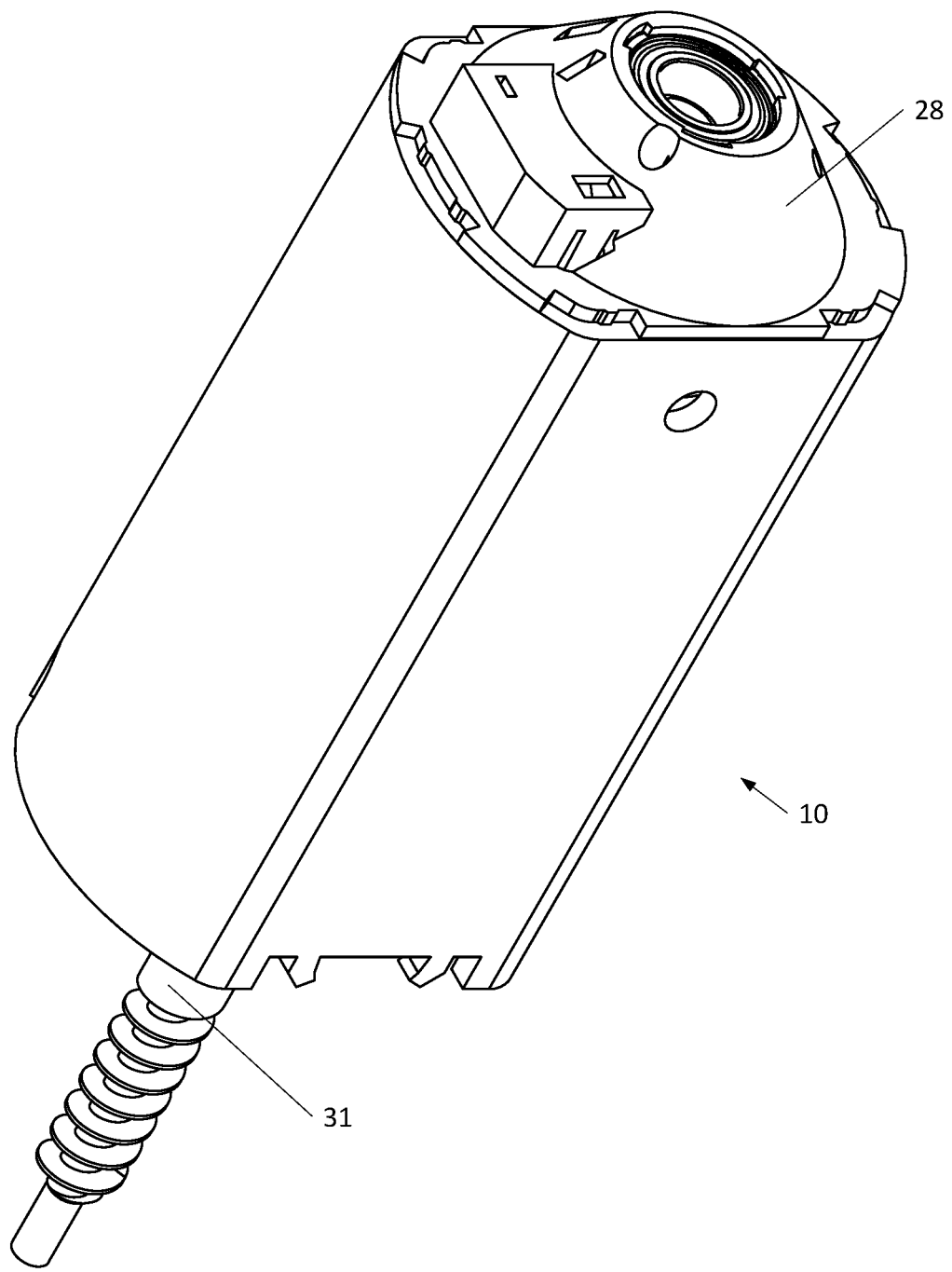
Figure 15:
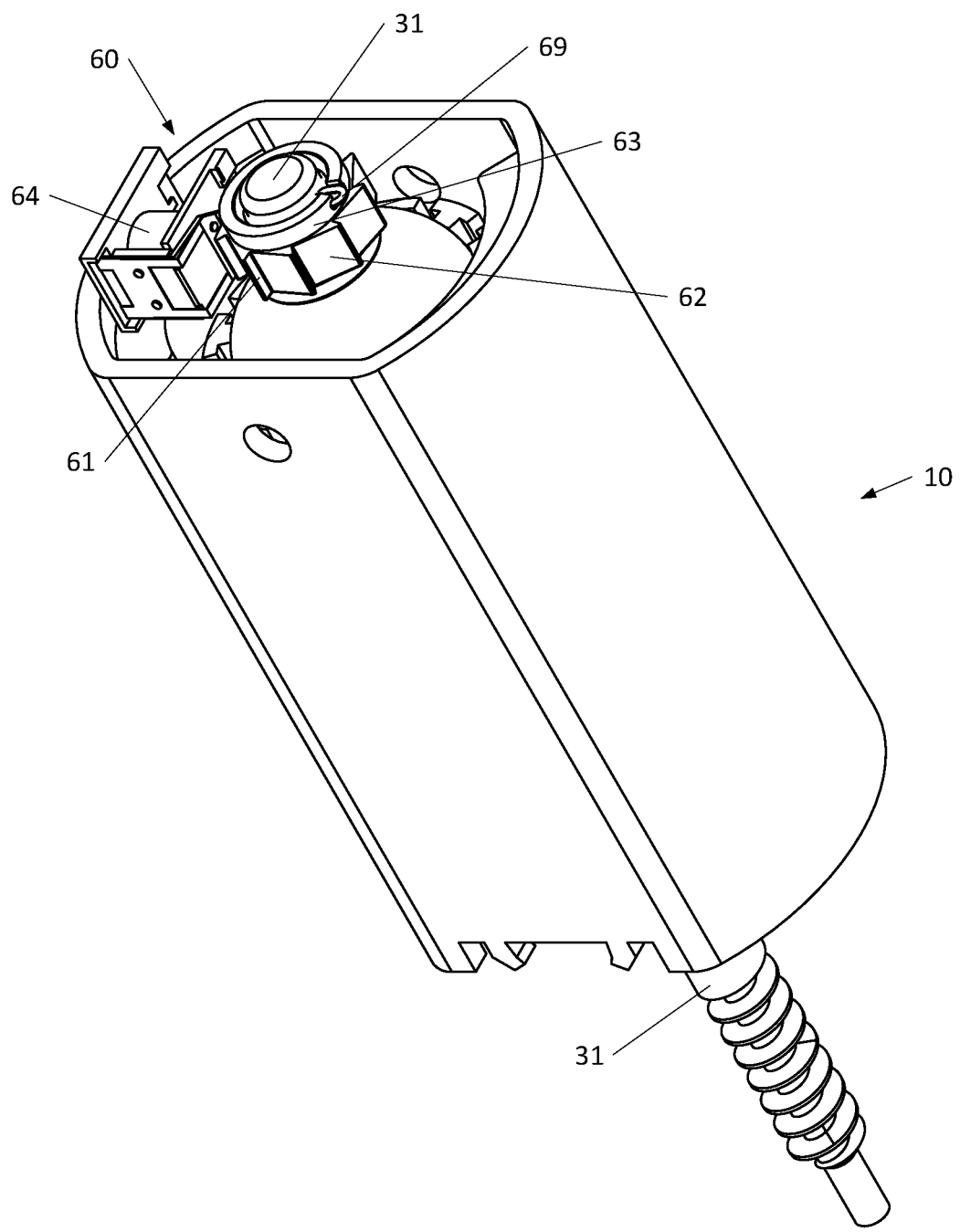
Figure 16:
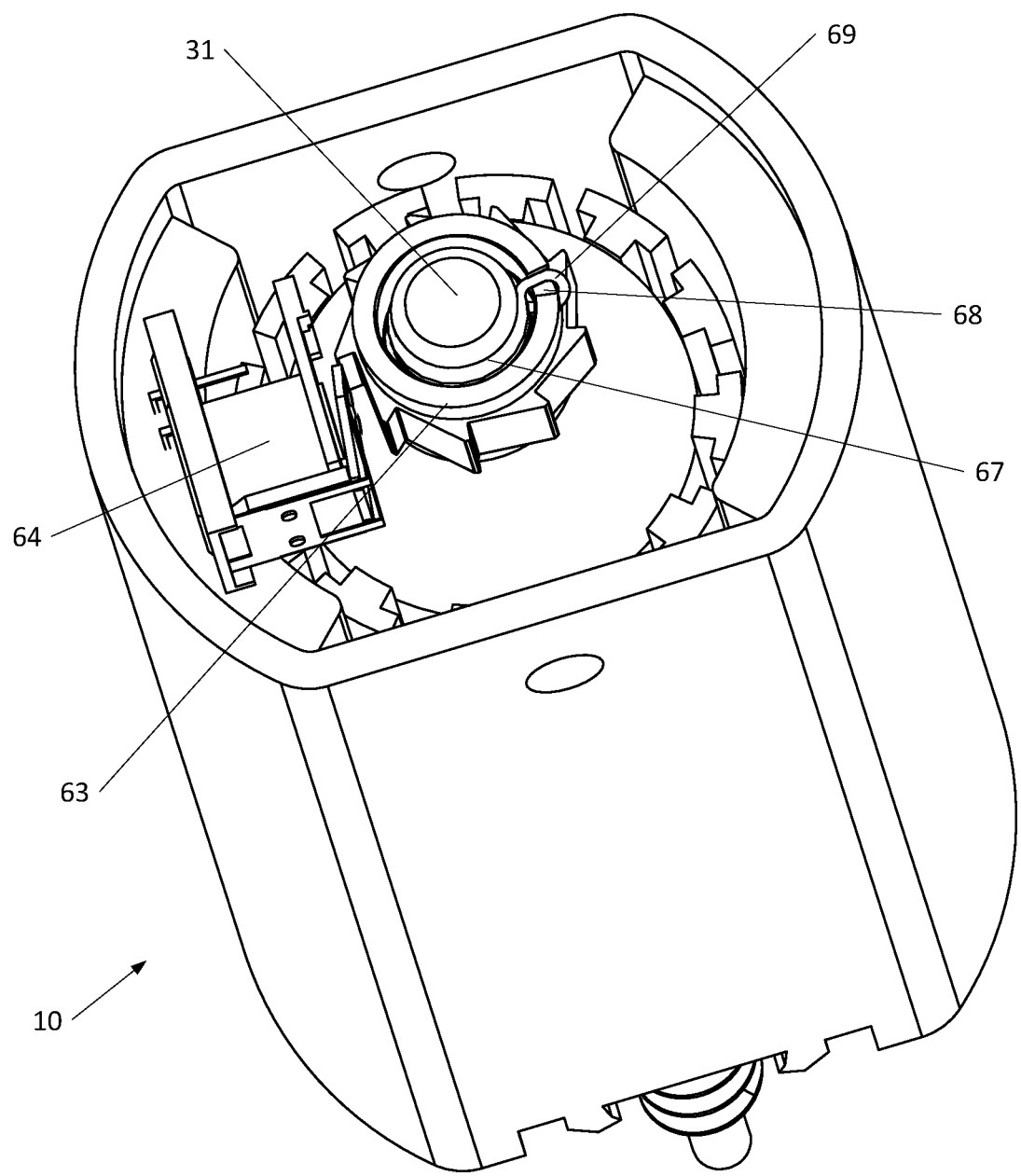

FIGS. 14 to 18 illustrates a sixth embodiment based on the electro-mechanical locking mechanism of the second or third embodiment, where the locking mechanism 40, 60 comprises a torque limiting clutch in the form of a coil spring 67 arranged between the motor shaft 31 and the rotating locking element 63. The locking mechanism 40, 60 can be covered by a housing 28 as shown in FIG. 14.

Figure 18:
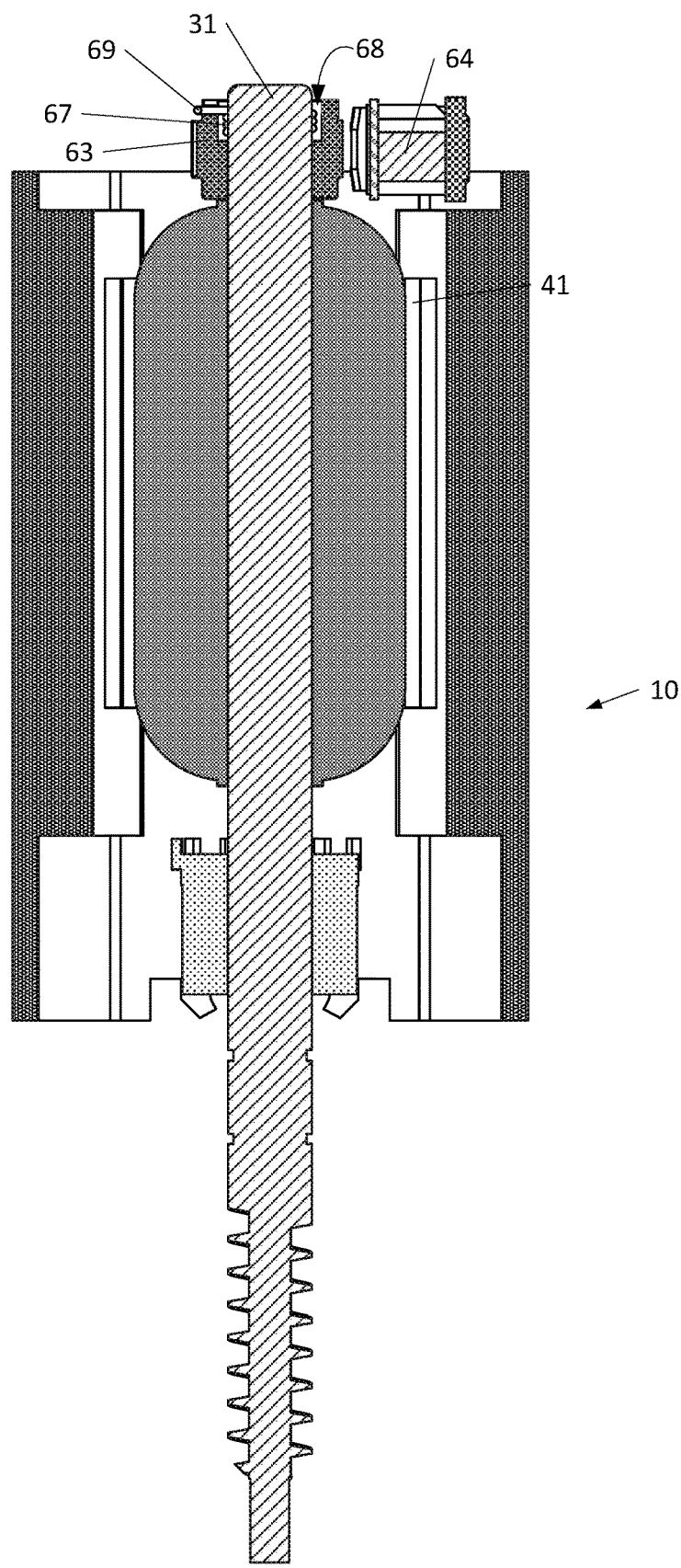
Figure 19:
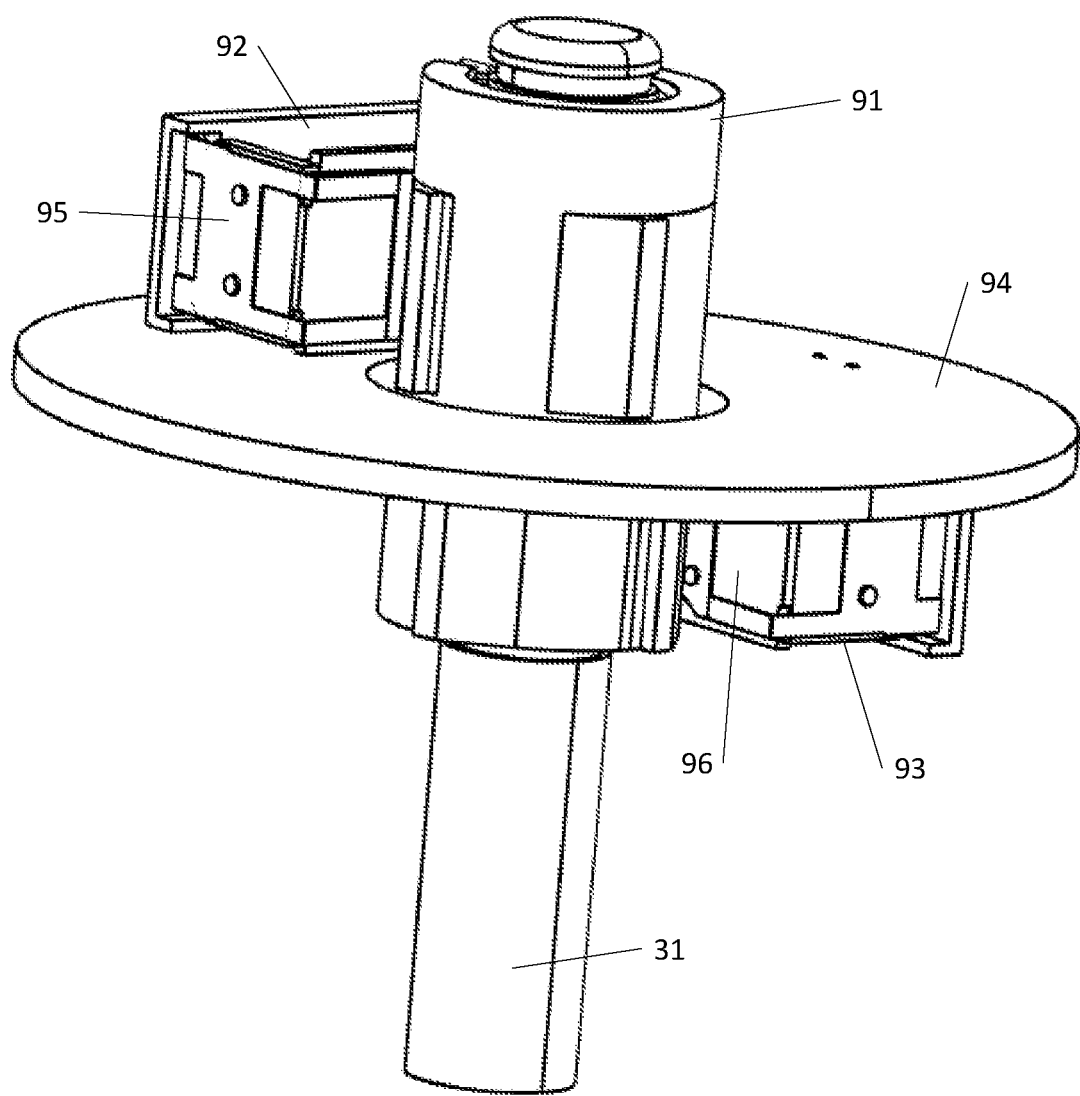
Figure 20:
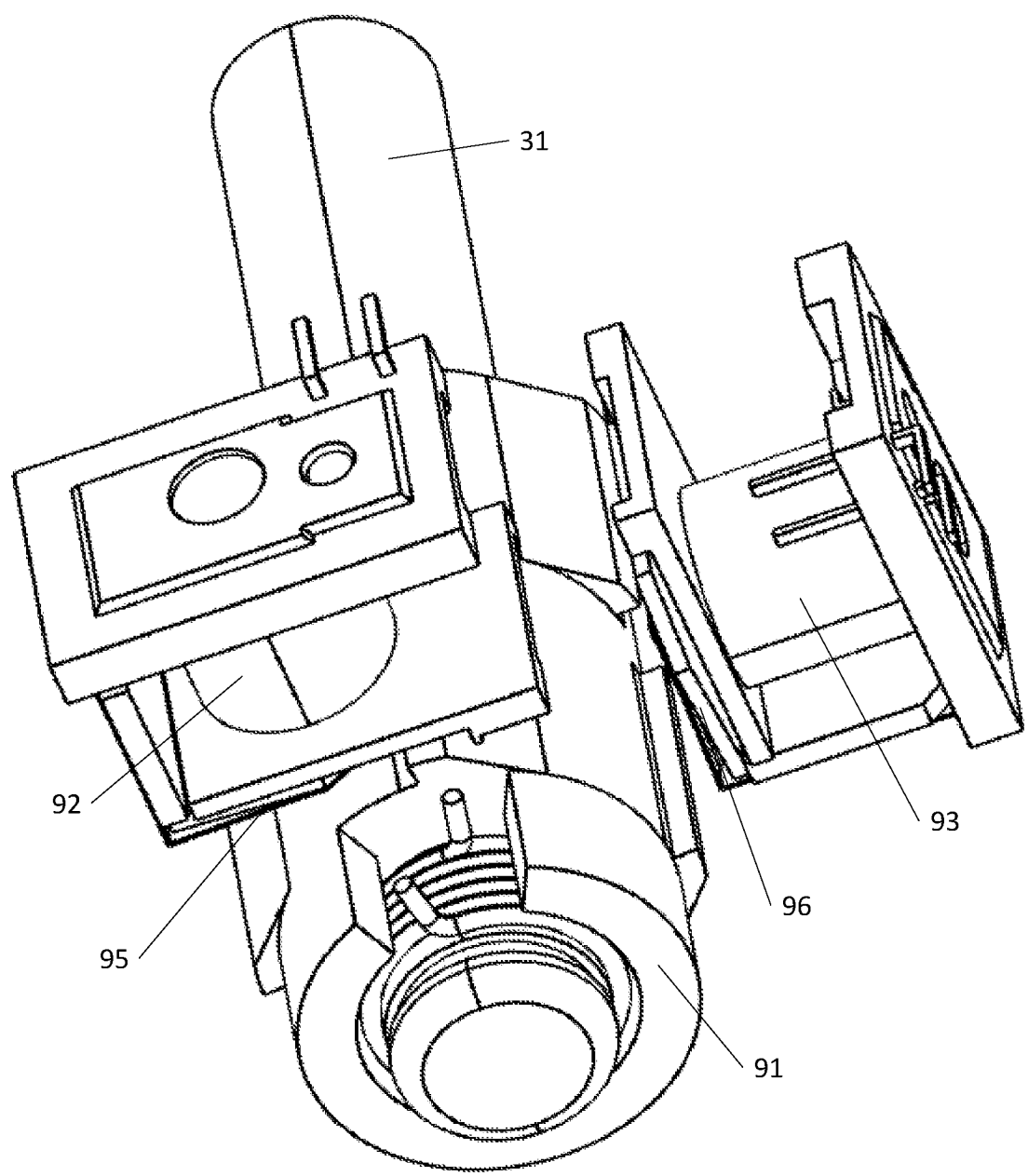

In this sixth embodiment, the locking mechanism 40, 60 operates as described in the first and second embodiment. The torque limiting clutch in the form of the coil spring 67 is arranged between an inner surface of a cup-shaped or hollow end 68 of the rotating locking element 63 and an outer side of the motor shaft 31, thereby establishing the clutch integrated with the rotating locking element 63. A free end 69 of the coil spring 67 rests in a slot 39 in the rotating locking element 63. The coil spring 67 is with its winding connected to the motor shaft 31, e.g. with a tight grip, such that the rotating locking element 63 rotates with the motor shaft 31, when the nonrotating locking element 65 is in a retracted position. As seen in FIG. 18, the rotating locking element 63 surrounds a part of the motor shaft 31, but can rotate relative to it, and is thereby only in driving connection via the coil spring 63.

Figure 17:
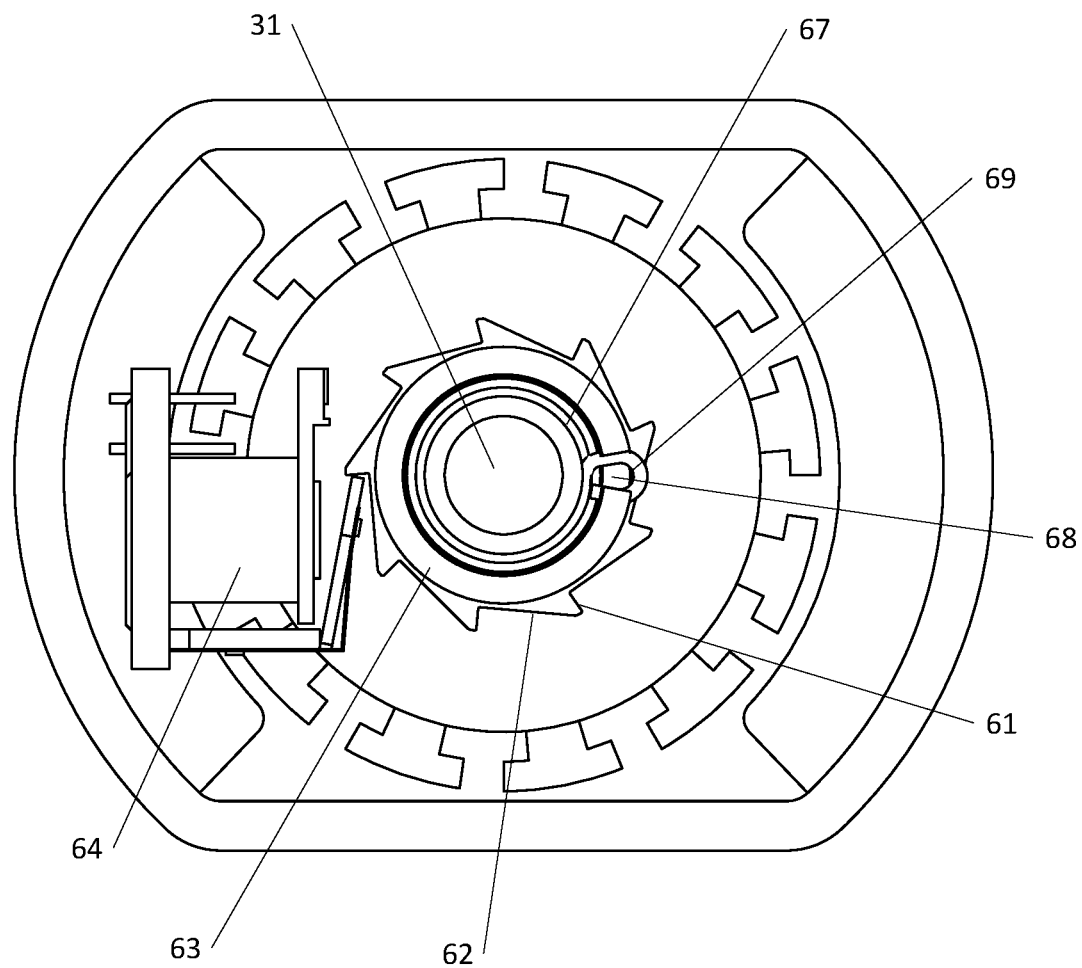

When the nonrotating locking element 65 is in a projected position as seen in FIG. 17, the rotating locking element 63 is kept in a non-rotating position, i.e. held against rotation. The same is true for the motor shaft 31 which, via the rotating locking element 63, is held against rotation, whereby the electric motor 10 is unidirectionally locked in either the clockwise direction or the counterclockwise direction.

This sixth embodiment of the electric motor 10 is able to anticipate and avoid damage on the locking mechanism 40, 60 in a similar manner as described under the fifth embodiment, if an excessive force is applied to the motor shaft 31.

FIGS. 19 to 22 illustrates a seventh embodiment based on the electro-mechanical locking mechanism of the second and sixth embodiments. In this seventh embodiment, the electro-mechanical locking mechanism is bidirectional. To simplify the illustration, only the motor shaft 31 of the electric motor and the electro-mechanical locking mechanism 90 is depicted.

The locking mechanism 90 has a rotating locking element 91 embodied as a locking sleeve having two rows of cams arranged in opposite directions. This means that one row of cams has an engageable side facing the clockwise direction of rotation, and the other facing the counterclockwise direction of rotation. Each of the rows of cams comprises four cams. The locking mechanism 90 comprises two solenoids 92, 93, which are both attached to the same printed circuit board 94, however on opposite sides thereof. Each of the two solenoids 92, 93 has a nonrotating locking element 95, 96 connected thereto. The nonrotating locking elements 95, 96 are, as in the above embodiments, arranged such that they can engage with the engageable side 97, 98 of a cam 99, 100. FIGS. 21 and 22 shows both the engageable side 97, 98 and the non-engageable side 101, 102 of each of the cams 99, 100, which belong to one of the rows of cams. The planes of each of the engageable sides 97, 98 face towards each other but are not in the same plane. The engageable sides 97, 98 of the two rows of cams are arranged in relation to the nonrotating locking elements 95, 96 of their respective solenoids in such a way that the angular positions of the rotating locking element 91, where one of the nonrotating locking elements 95, 96 engages an engageable side 101, 102 of its corresponding row of cams, are different from the corresponding positions for the other nonrotating locking element. The reason for this is to avoid that both of the non-rotating locking elements are under load at the same time. Arranging the cams in this way ascertains that it will, at all times, be possible by reversing to release at least one of the directions of rotation.

The locking mechanism 90 also comprises a coil spring 103, of a cup-shaped 25 or hollow end 104 of the rotating locking element 91. The coil spring 103 has two free ends 104,105 which are rotationally displaceable arranged in a slot in the rotating locking element 91.

When the nonrotating locking elements 95,96 are in a projected position and thereby engages the engageable side 97,98 of cams 99,100, the rotating 30 locking element 91 is kept in a non-rotating position, that is held against rotation. The same is true for the motor shaft 31 which, via the rotating locking element 91, is held against rotation, whereby the electric motor 10 is bidirectionally locked in both the clockwise direction and the counterclockwise direction.

In principle, the locking mechanism 90 only locks the electric motor 10 unidirectionally, as the load on the motor shaft will either be in the clockwise direction or the counterclockwise direction. Depending on the situation, the load on the motor shaft 31 may shift from e.g. a clockwise direction to a counterclockwise direction. In such a situation, the locking mechanism 90 will still be able to lock the electric motor.

The electric motor having the locking mechanism 90 may also experience the abovementioned fault situations, where an excessive load is applied to the non-rotating locking element 91. In such a situation, the winding of the coil spring 103 will slide in relation to the motor shaft 31, as described above, exerting a friction force on the motor shaft 31 when it rotates. Again, this essentially anticipates and avoids said damage on the locking mechanism 90.

FIG. 23 illustrates that the electric motor 80 comprises a controller 81 adapted for receiving a signal 82 from the at least one rotation sensor 83, where the controller comprises a processor 84, and the controller is capable of exerting position, speed and direction controls for the electric motor. Further, the controller is capable of switching the locking mechanism 85 on or off, by switching the electrical current to the coil 86 on or off.

FIG. 24 illustrates a table comprising an actuator mechanism 90 driven by an electric motor 10. The actuator mechanism is adapted for raising and lowering the table, in which rotation of the motor shaft against an expected load (thereby raising the table) requires significantly more power than the opposite direction (lowering the table), which is rotating with the expected load. In the case of embodiments 1 through 6 of the locking mechanism, the unidirectionality of the locking mechanism 40, 60 manifests itself in that it is adapted to lock against rotation in the direction where the weight is pushing the table downwards.

Specifically FIG. 24 shows one possible embodiment of an actuator mechanism 110, where a linear actuator operating according to a nut and spindle principle comprises a motor 10, which drives the actuator. A load 111 is shown in the form of weights to be lifted and lowered. The loading pattern of the actuator is configured to controllably lift or lower the weight by transforming, in a known manner, the rotation of the motor into a movement either extending or retracting the length of the linear actuator. In this case, when the motor 10 rotates against the load, the weight travels upwards. When the motor rotates with the load, the weight travels downwards. It follows that it requires significantly more power to move the weight up than it does to move the weight down. The locking mechanism 40, 60 of the motor 10 has a feature of unidirectionality, in as much as the locking of the motor works only in a direction to keep the actuator mechanism 90 from moving in a downwards direction when the motor is switched off and locked.

A fault situation may occur if the electrical current to the locking mechanism is unintendedly interrupted. If such interruption should occur at a time when the table is during lowering, the solenoid will lose magnetization and consequently the non-rotating locking element will come into sudden contact with the rotating locking element. Rotation of the rotating locking element will come to an immediate standstill. Due to the inertia of the table, the impact may be great enough to damage the locking mechanism. If e.g., either the non-rotating or the rotating locking element should break, the table might uncontrollably keep lowering at increased speed. The presence of a torque limiting clutch 36, when properly adjusted, will cause sliding to take place between the clutch 36 and the motor shaft 31. This will protect the locking mechanism from breaking. Instead, the table will then either continue to lower but at a much-reduced speed, or it may actually brake or stop the table in the fault situation.

The invention claimed is:

1. A linear actuator (1) comprising:
   an electric motor (10);
   a spindle (4) driven by said reversible motor (10); and
   a spindle nut (6) mounted on the spindle (4) and secured against rotation, said spindle nut (6) being arranged to be moved between two end positions,
   said electric motor (10) comprising a stator attached to a motor housing (20) and a rotor comprising a motor shaft (31), where the motor (10) is adapted to be electrically controlled to selectively rotate the rotor in one of two opposite angular directions,
   wherein the electric motor further comprises an electromechanical locking mechanism (40, 60), said electromechanical locking mechanism (40, 60) comprising:
      an electromechanical transducer (41, 64), which is attached immovably in relation to the motor housing (20) and comprises an electromechanical solenoid and a nonrotating locking element (44), the electromechanical transducer (41, 64) being adapted to be electrically controlled to selectively shift the nonrotating locking element (44) between a projected and a retracted position; and
      a rotating locking element (45, 63) attached to the motor shaft (31) and comprising at least one cam (47, 61) projecting in a direction towards the transducer (41, 64), wherein the at least one cam (47, 61) comprises a non-engageable side opposite to an engageable side,
   wherein the nonrotating locking element (44) is arranged to project in a direction towards the rotating locking element (45, 63) and to interferingly lock with the at least one cam (47, 61), by selectively engaging the engageable side of the at least one cam (47, 61),
   wherein the electromechanical transducer (41, 64) is configured to control the engagement by keeping the nonrotating locking element (44) in a position not engaging the engageable side of the at least one cam (47, 61), when the electromechanical transducer (41, 64) is energized, and the electromechanical transducer (41, 64) further comprises a spring element arranged to keep the nonrotating locking element (44) in a position engaging the engageable side of the at least one cam (47, 61), when the electromechanical transducer (41, 64) is not energized,
   wherein the electromechanical solenoid operates about a longitudinal axis that is not coincident with a longitudinal axis of the motor shaft,
   whereby the electromechanical locking mechanism (40, 60) is configured to lock the motor shaft (31) against rotation in one rotational direction, thereby locking the motor (10) unidirectionally.

2. The linear actuator according to claim 1, characterized in that the electromechanical solenoid comprises a coil (42, 86).

3. The linear actuator according to claim 2, characterized in that the electromechanical solenoid comprises a pivot arm (43), where a distal end of said pivot arm (43) constitutes the nonrotating locking element (44) and the pivot arm further comprises an armature (74) configured to be activated by a current in said coil (42, 86), and that said spring element comprises a leaf spring (73) configured to bias the pivot arm (43) in a direction towards said rotating element (45, 63).

4. The linear actuator according to claim 2, characterized in that the electromechanical solenoid is a subminiature signal relay.

5. The linear actuator according to claim 2, characterized in that the electromechanical transducer (41, 64) further comprises a support member (27) immovably attached to the housing (20, 22, 23) and configured to support the electromechanical solenoid against tilting and shearing forces.

6. The linear actuator according to claim 2, characterized in that the rotating locking element (45) is shaped as a disc.

7. The linear actuator according to claim 6, characterized in that the longitudinal axis (33) of the motor shaft (31) and the longitudinal axis (48) of the solenoid coil (42) are parallel.

8. The linear actuator according to claim 2, characterized in that the rotating locking element (45, 63) is shaped as a sleeve.

9. The linear actuator according to claim 8, characterized in that a longitudinal axis (33) of the motor shaft (31) and a longitudinal axis of the solenoid coil (42) are orthogonal.

10. The linear actuator according to claim 1, characterized in that the motor comprises a torque limiting clutch arranged between the rotating locking element (45, 63, 91) and the motor shaft (31).

11. The linear actuator according to claim 10, characterized in that the torque limiting clutch is a coil spring with a multiple turns winding (36, 67), wherein the winding (36, 67) is tightly wound around the motor shaft (31) such that the coil spring does not slide on the motor shaft (31) during normal operation, and a free end (37, 69) of the coil spring is attached in a slot (39) in the rotating locking element (45, 63).

12. The linear actuator according to claim 1, characterized in that it comprises a rotating member facilitating detection of rotation, where the rotating member is fixedly arranged on the motor shaft, and comprises at least one rotation sensor, said sensor being directly or indirectly fixed to the housing.

13. The linear actuator according to claim 12, characterized in that the motor comprises a printed circuit board immovably attached to the motor housing, and where the at least one rotation sensor is mechanically and electrically connected to the printed circuit board.

14. The linear actuator according to claim 13, characterized in that said printed circuit board is also holding the electromechanical transducer (41, 64) and providing electrical connections thereto.

15. The linear actuator according to claim 12, characterized in that it comprises a controller adapted for receiving a signal from the at least one rotation sensor, where the controller comprises a processor, and where the controller is configured to exert position, speed and direction controls for the motor, and where the controller is further configured to switching the nonrotating locking element between its projected and its retracted position by switching the electrical current to the coil on or off.

16. The linear actuator according to claim 1, characterized in that the electromechanical locking mechanism comprises:
   a rotating locking element (91) comprising two sets of cams arranged in opposite directions; and
   two electromechanical transducers (92, 93), each one being arranged to have its nonrotating locking element selectively engage the engageable side of a respective one of the two oppositely arranged sets of cams.

17. An actuator system (9) comprising:
a linear actuator (1) according to claim 1;
a control box (13) comprising at least a power supply (14) and a driver circuit (16) configured to drive the electric motor (10) of the linear actuator (1); and
a cable (12) connecting the linear actuator (1) to the driver circuit (16) in the control box (13).

18. A height adjustable table comprising an actuator system (9) according to claim 17.

* * * * *